(12) United States Patent
Wittek et al.

(10) Patent No.: US 8,821,757 B2
(45) Date of Patent: Sep. 2, 2014

(54) LIQUID-CRYSTALLINE MEDIUM

(75) Inventors: Michael Wittek, Erzhausen (DE); Brigitte Schuler, Grossostheim (DE); Lars Lietzau, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/578,890

(22) PCT Filed: Jan. 25, 2011

(86) PCT No.: PCT/EP2011/000306
§ 371 (c)(1),
(2), (4) Date: Aug. 14, 2012

(87) PCT Pub. No.: WO2011/098214
PCT Pub. Date: Aug. 18, 2011

(65) Prior Publication Data
US 2012/0314146 A1    Dec. 13, 2012

(30) Foreign Application Priority Data

Feb. 15, 2010 (DE) .......................... 10 2010 007 993

(51) Int. Cl.
| | | |
|---|---|---|
| *C09K 19/12* | (2006.01) | |
| *C09K 19/52* | (2006.01) | |
| *C09K 19/06* | (2006.01) | |
| *C09K 19/34* | (2006.01) | |
| *C09K 19/30* | (2006.01) | |
| *C09K 19/00* | (2006.01) | |
| *C09K 19/02* | (2006.01) | |

(52) U.S. Cl.
USPC ............. 252/299.66; 252/299.01; 252/299.6; 252/299.61; 252/299.63; 428/1.1; 428/1.3; 349/182

(58) Field of Classification Search
USPC ............. 252/299.01, 299.6, 299.63, 299.61, 252/299.66; 428/1.1, 1.3; 349/182
See application file for complete search history.

(56) References Cited

U.S. PATENT DOCUMENTS

| | | | |
|---|---|---|---|
| 6,808,764 B2 | 10/2004 | Heckmeier et al. | |
| 7,250,198 B2 | 7/2007 | Heckmeier et al. | |
| 7,604,851 B2 | 10/2009 | Heckmeier et al. | |
| 7,635,505 B2 * | 12/2009 | Manabe et al. | 428/1.1 |
| 7,682,671 B2 * | 3/2010 | Czanta et al. | 428/1.1 |
| 2003/0213935 A1 | 11/2003 | Heckmeier et al. | |
| 2003/0228426 A1 | 12/2003 | Heckmeier et al. | |
| 2007/0269614 A1 | 11/2007 | Heckmeier et al. | |
| 2008/0128653 A1 | 6/2008 | Manabe et al. | |
| 2009/0101869 A1 | 4/2009 | Czanta et al. | |

FOREIGN PATENT DOCUMENTS

| | | |
|---|---|---|
| DE | 102 43 776 A1 | 4/2003 |
| DE | 10 2004 012 970 A1 | 10/2004 |
| DE | 10 2007 009 944 A1 | 9/2007 |
| EP | 1 333 082 A1 | 8/2003 |

OTHER PUBLICATIONS

International Search Report of PCT/EP2011/000306 (Apr. 13, 2011).

* cited by examiner

*Primary Examiner* — Geraldina Visconti
(74) *Attorney, Agent, or Firm* — Millen, White, Zelano & Branigan, P.C.

(57) ABSTRACT

The invention relates to a liquid-crystalline medium comprising one or more compounds of the formula (I), in which $R^0$ has the meanings indicated in Claim 1, and to the use thereof in electro-optical liquid-crystal displays.

18 Claims, No Drawings

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells. TN, STN, positive VA, FFS (fringe field switching) and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulatormetal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. High low-temperature stability is required, so that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the trans-missive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having fast response times are required in order to be able to reproduce multimedia content, such as, for example, films and video games, in near-realistic quality. Such short response times can be achieved, in particular, if liquid-crystal media having low values for the viscosity, in particular the rotational viscosity $\gamma_1$, and having high optical anisotropy ($\Delta n$) are used.

Furthermore, the mixtures according to the invention are also suitable for positive VA applications, also known as HT-VA applications. These are taken to mean electro-optical displays having an in-plane drive electrode configuration and homeotropic arrangement of the liquid-crystal medium having positive anisotropy.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
  extended nematic phase range (in particular down to low temperatures)
  the ability to switch at extremely low temperatures (outdoor use, automobiles, avionics)
  increased resistance to UV radiation (longer lifetime) low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAs, notebooks, games consoles), a significant reduction in the response times is desired. This requires LC mixtures having low rotational viscosities. At the same time, the LC media should have high clearing points.

However, it has been found that the LC media known from the prior art often have inadequate stability, in particular inadequate specific resistance, and an inadequate voltage holding ratio (VHR or HR), in particular in the case of rising temperature and after heating and/or UV exposure.

The invention is based on the object of providing media, in particular for MLC, TN, STN, FFS or IPS displays of this type, which have the desired properties indicated above and do not exhibit the disadvantages indicated above or only do so to a lesser extent. The LC media should preferably have fast response times and low rotational viscosities at the same time as high birefringence. In addition, the LC media should have a high clearing point, high dielectric anisotropy and a low threshold voltage.

In particular, the LC media should have high HR values, especially in the case of rising temperature and after heating and/or UV exposure, and exhibit high low-temperature stability (LTS), so that no crystallisation occurs, even at low temperatures.

It has now been found that this object can be achieved if LC media comprising one or more compounds of the formula I are used. The compounds of the formula I result in mixtures having the desired properties indicated above.

The invention relates to a liquid-crystalline medium, characterised in that it comprises one or more compounds of the formula I

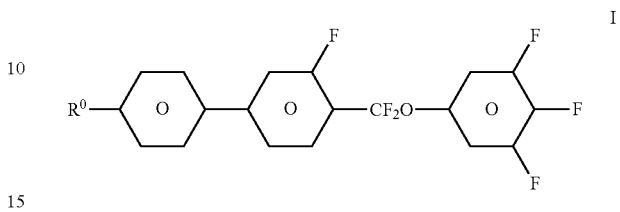

in which $R^0$ denotes an alkyl or alkoxy radical having 1 to 15 C atoms, where, in addition, one or more $CH_2$ groups in these radicals may each be replaced, independently of one another, by —C≡C—, —CF$_2$O—, —CH=CH—,

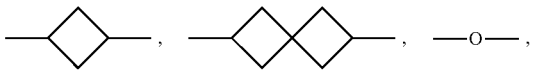

—CO—O— or —O—CO— in such a way that O atoms are not linked directly to one another, and where, in addition, one or more H atoms may be replaced by halogen.

Surprisingly, it has been found that LC media comprising compounds of the formula I have high HR values and a stable electro-optical curve after heating and/or UV exposure.

Furthermore, the compounds of the formula I are very readily soluble in liquid-crystalline media and enable the preparation of LC media having high low-temperature stability.

In addition, the LC media according to the invention comprising compounds of the formula I exhibit a very good ratio of rotational viscosity $\gamma_1$ and clearing point, a high value for the optical anisotropy $\Delta \epsilon$ and adequate birefringence $\Delta n$, fast response times, a low threshold voltage, a high clearing point, high positive dielectric anisotropy and a broad nematic phase range.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or in order to optimise its threshold voltage and/or its viscosity.

Particular preference is given to compounds of the formula I in which $R^0$ denotes $C_2H_5$, n-$C_3H_7$ or n-$C_5H_{11}$.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

A particularly suitable and preferred preparation process for compounds of the formula I is described below. Suitable reaction conditions are known to the person skilled in the art.

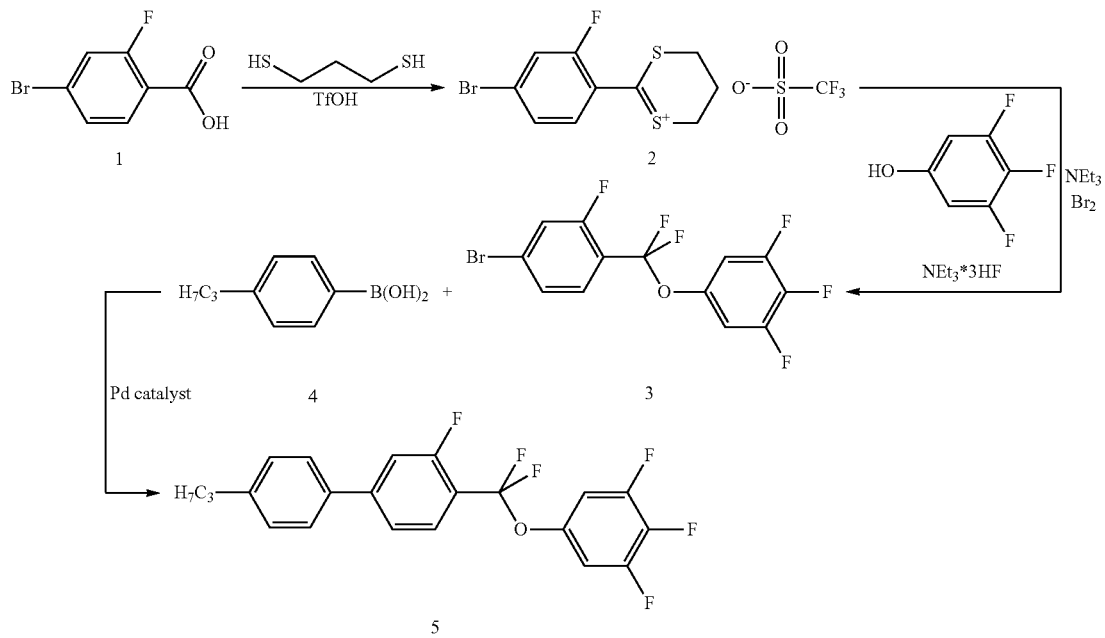

4-Bromo-2-fluorobenzoic acid 1 is reacted with propanedithiol and trifluoromethanesulfonic acid with elimination of water to give dithianylium triflate 2. The salt 2 obtained is converted into the difluoromethyl ether 3 in an oxidative fluorination. After final boronic acid coupling to 4-propylphenylboronic acid 4, the desired target molecule 5 is obtained.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polyhalogenated.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CH_2F$, $OCFHCF_2CF_3$, $OCFHCF_2CHF_2$, $OCH═CF_2$, $OCF═CF_2$, $OCF_2CHFCF_3$, $OCF_2CF_2CF_3$, $OCF_2CF_2CClF_2$, $OCClFCF_2CF_3$, $CF═CF_2$, $CF═CHF$ or $CH═CF_2$, very particularly preferably F or $OCF_3$.

Further preferred embodiments are indicated below:

The medium additionally comprises one or more neutral compounds of the formulae II and/or III,

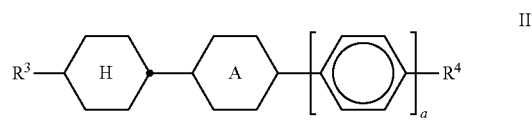

in which

A denotes 1,4-phenylene or trans-1,4-cyclohexylene, a is 0 or 1, and $R^3$ denotes alkenyl having 2 to 9 C atoms, and $R^4$ has the meaning indicated for $R^0$ in formula I and preferably denotes alkyl having 1 to 12 C atoms or alkenyl having 2 to 9 C atoms.

The compounds of the formula II are preferably selected from the following formulae,

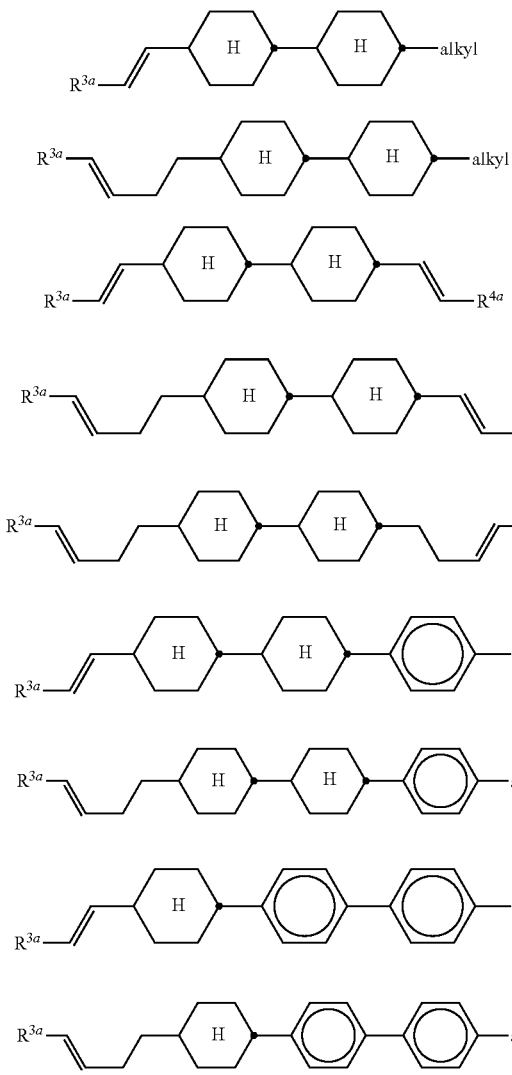

in which $R^{3a}$ and $R^{4a}$ each, independently of one another, denote H, $CH_3$, $C_2H_5$ or $C_3H_7$, and "alkyl" denotes a straight-chain alkyl group having 1 to 8 C atoms. Particular preference is given to compounds of the formula IIa and IIf, in particular in which $R^{3a}$ denotes H or $CH_3$, and compounds of the formula IIc, in particular in which $R^{3a}$ and $R^{4a}$ denote H, $CH_3$ or $C_2H_5$.

Preference is furthermore given to compounds of the formula II which have a non-terminal double bond in the alkenyl side chain:

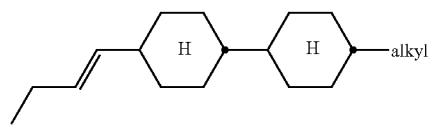

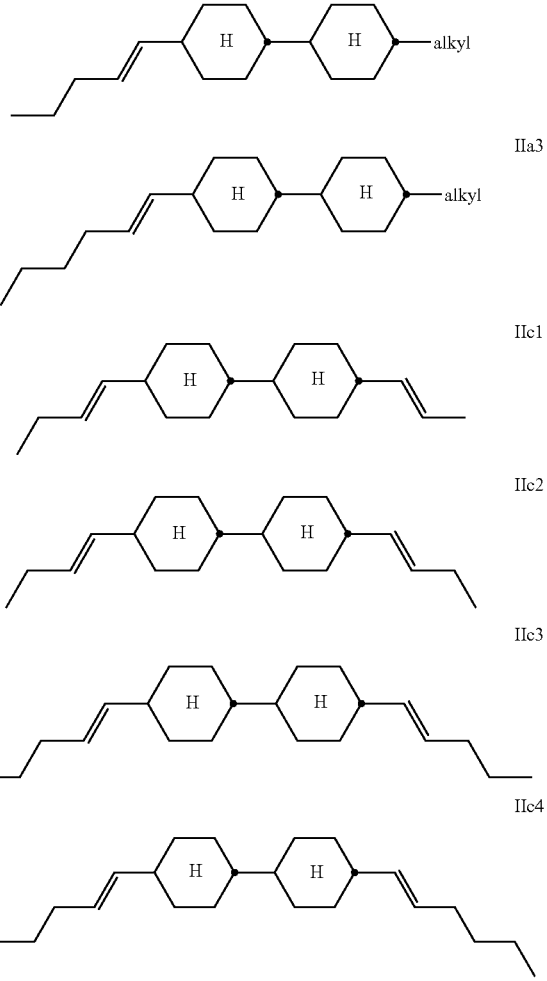

Very particularly preferred compounds of the formula II are the compounds of the formulae

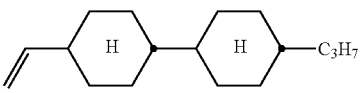

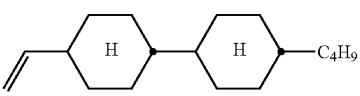

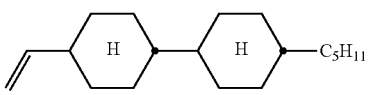

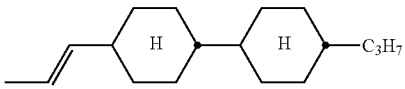

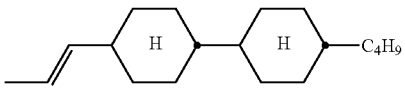

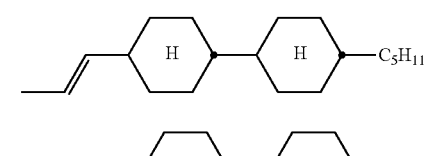 IIa5c

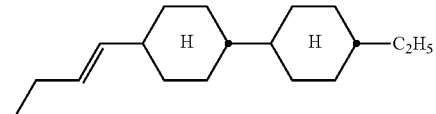 IIa1a

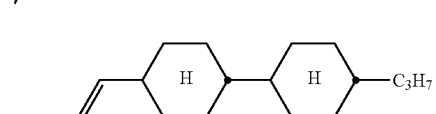 IIa1b

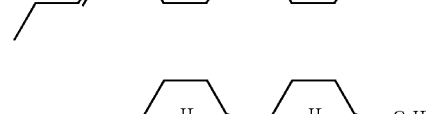 IIa1c

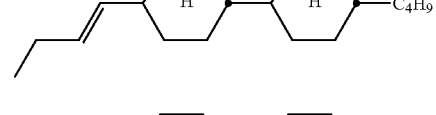 IIa1d

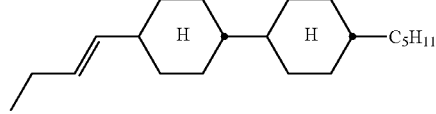 IIa2a

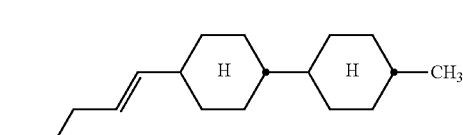 IIa2b

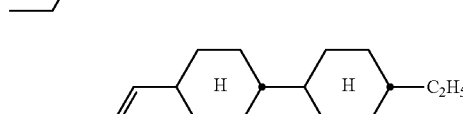 IIa2c

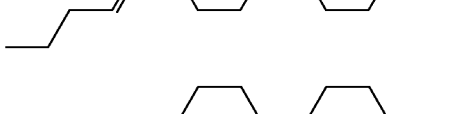 IIa2d

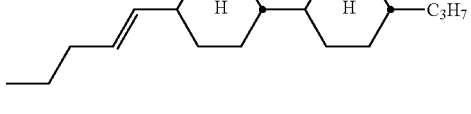 IIa2e

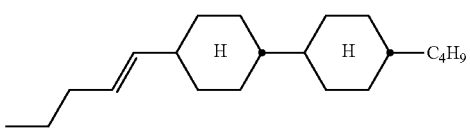 IIa3a

 IIa3b

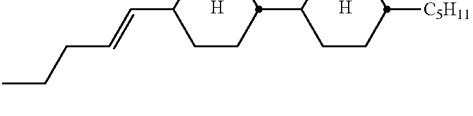 IIa3c

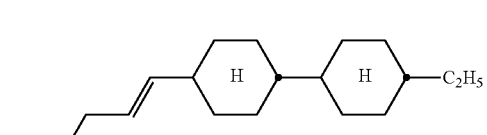 IIa3d

The compounds of the formula III are preferably selected from the following formulae,

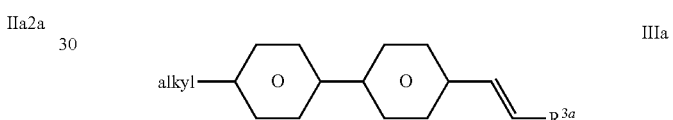 IIIa

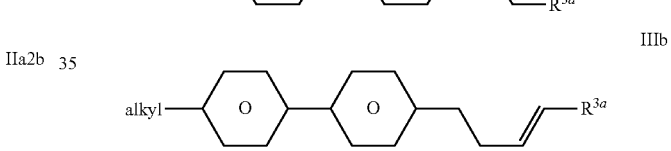 IIIb in which "alkyl" and $R^{3a}$ have the meanings indicated above, and $R^{3a}$ preferably denotes H or CH$_3$. Particular preference is given to compounds of the formula IIIIb;

The medium preferably additionally comprises one or more compounds selected from the following formulae,

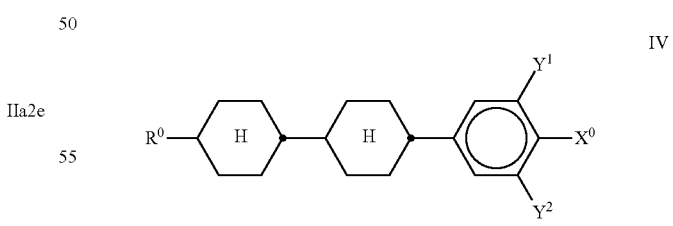 IV

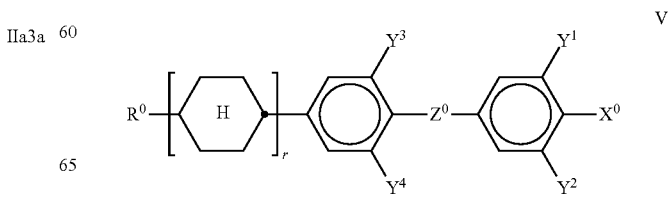 V

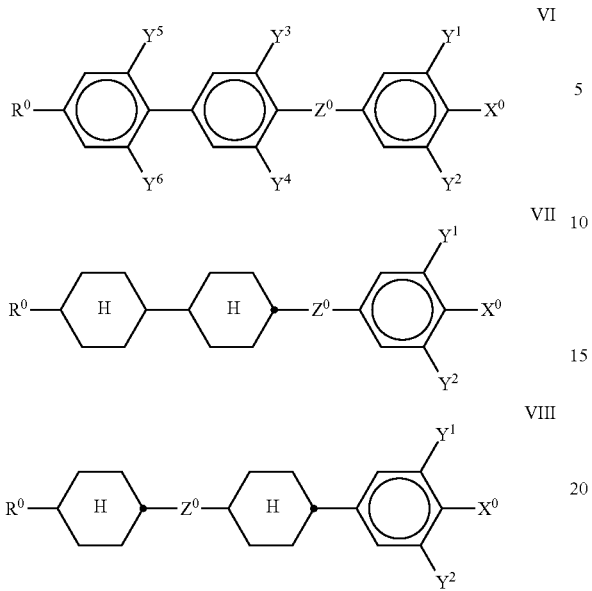

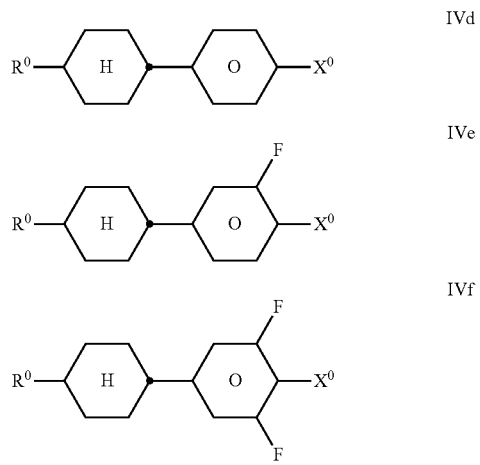

in which
- R⁰ has the meanings indicated in formula I, and
- $Y^{1-6}$ each, independently of one another, denote H or F,
- $Z^0$ denotes —C₂H₄—, —(CH₂)₄—, —CH═CH—, —CF═CF—, —C₂F₄—, —CH₂CF₂—, —CF₂CH₂—, —CH₂O—, —OCH₂—, —COO—, —CF₂O— or —OCF₂—, in the formulae V and VI also a single bond,
- $X^0$ denotes F, Cl, CN, SF₅, SCN, NCS, a halogenated alkyl radical, a halogenated alkenyl radical, a halogenated alkoxy radical or a halogenated alkenyloxy radical having up to 6 C atoms, and
- r denotes 0 or 1.

In the compounds of the formula IV to VIII, $X^0$ preferably denotes F or OCF₃, furthermore OCHF₂, CF₃, CF₂H, Cl, OCH═CF₂. R⁰ is preferably straight-chain alkyl or alkenyl having up to 6 C atoms.

The compounds of the formula IV are preferably selected from the following formulae,

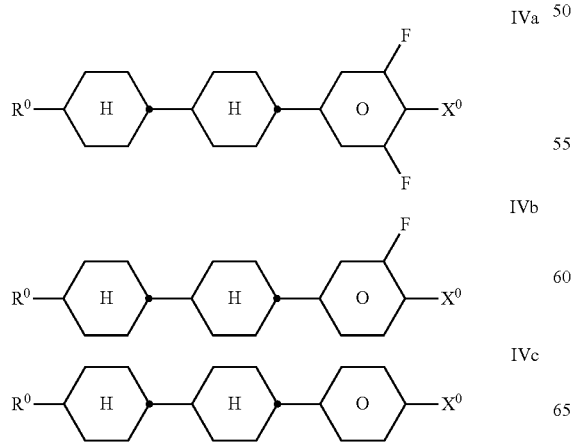

in which R⁰ and $X^0$ have the meanings indicated for formula IV.

Preferably, R⁰ in formula IV denotes alkyl having 1 to 8 C atoms and $X^0$ denotes F, Cl, OCHF₂ or OCF₃, furthermore OCH═CF₂. In the compound of the formula IVb, R⁰ preferably denotes alkyl or alkenyl. In the compound of the formula IVd, $X^0$ preferably denotes Cl, furthermore F.

The compounds of the formula V are preferably selected from the following formulae,

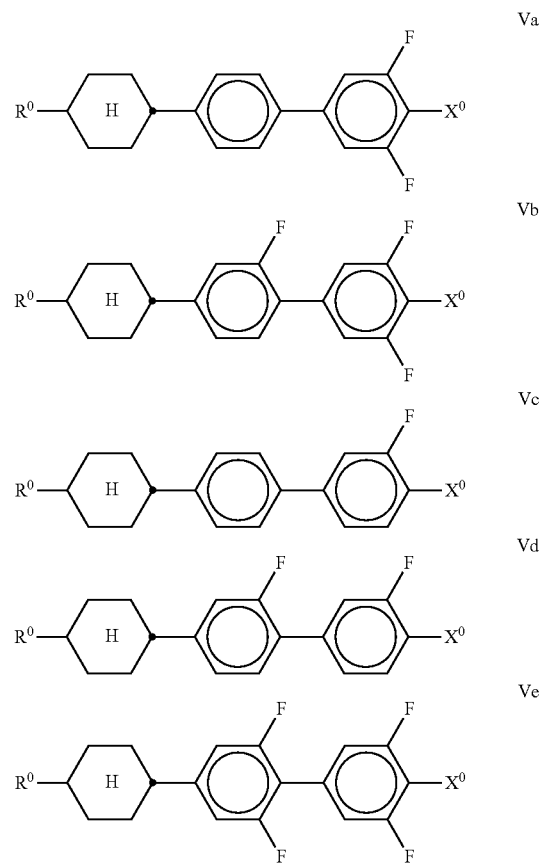

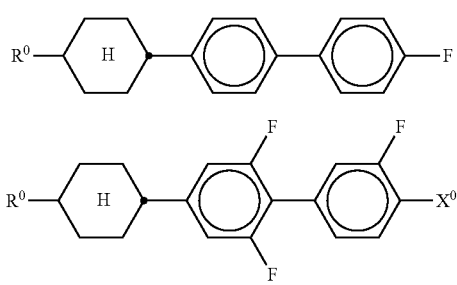                                             Vf

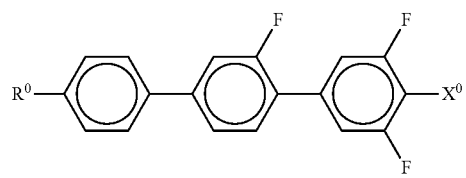                                             Vg in which $R^0$ and $X^0$ have the meanings indicated for formula V. Preferably, $R^0$ in formula V denotes alkyl having 1 to 8 C atoms and $X^0$ denotes F;

The medium comprises one or more compounds of the formula VI-1,

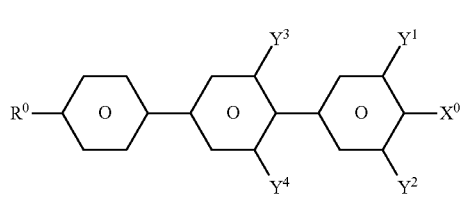                                             VI-1 particularly preferably those selected from the following formulae,

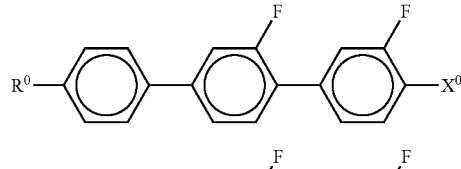                                            VI-1a

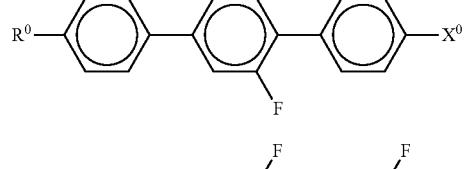                                            VI-1b

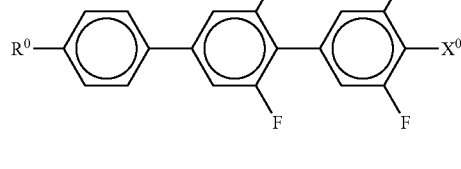                                            VI-1c

VI-1d in which $R^0$ and $X^0$ have the meanings indicated for formula VI. Preferably, $R^0$ in formula VI denotes alkyl having 1 to 8 C atoms and $X^0$ denotes F, furthermore $OCF_3$.

The medium comprises one or more compounds of the formula VI-2,

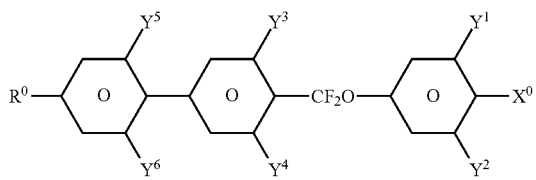                                             VI-2 which are different from the compounds of the formula I, particularly preferably those selected from the following formulae,

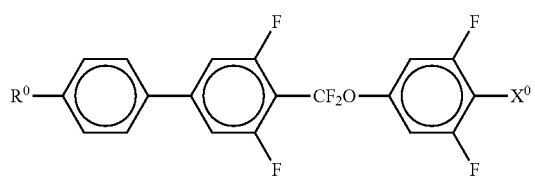                                             VI-2a

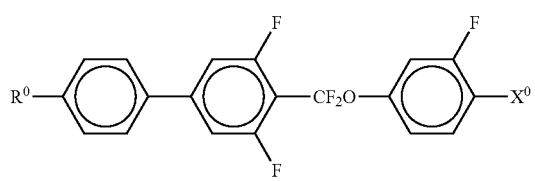                                             VI-2b

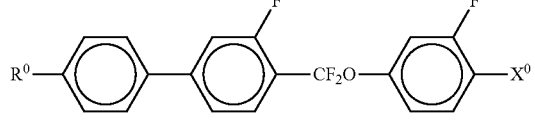                                             VI-2c

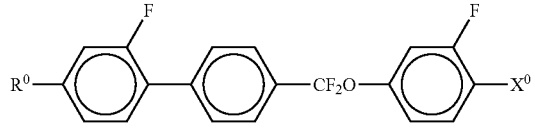                                             VI-2d

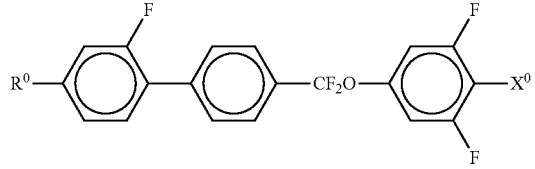                                             VI-2e in which $R^0$ and $X^0$ have the meanings indicated for formula VI. Preferably, $R^0$ in formula VI denotes alkyl having 1 to 8 C atoms and $X^0$ denotes F;

The medium preferably comprises one or more compounds of the formula VII in which $Z^0$ denotes —$CF_2O$—, —$CH_2CH_2$— or —COO—, particularly preferably those selected from the following formulae,

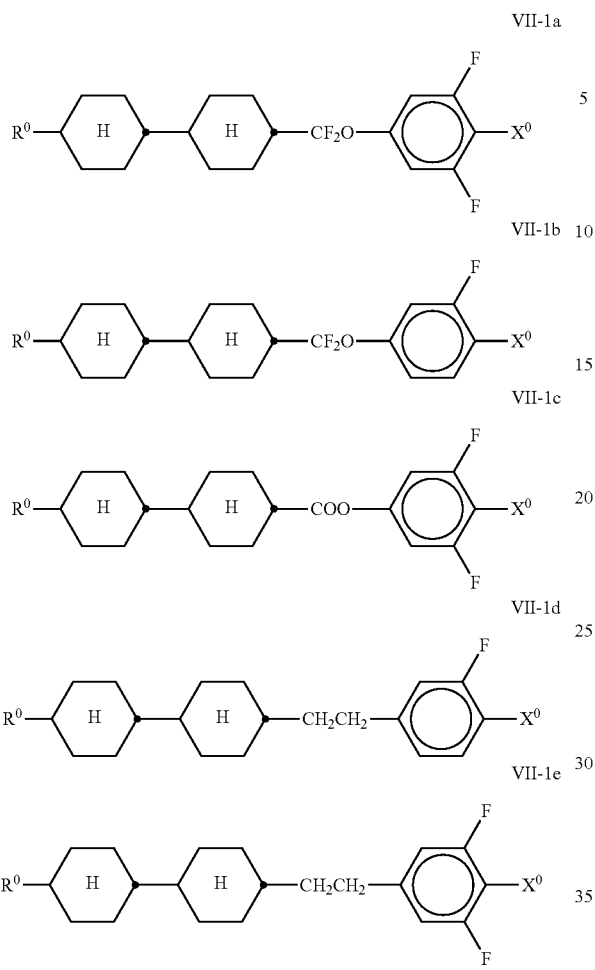

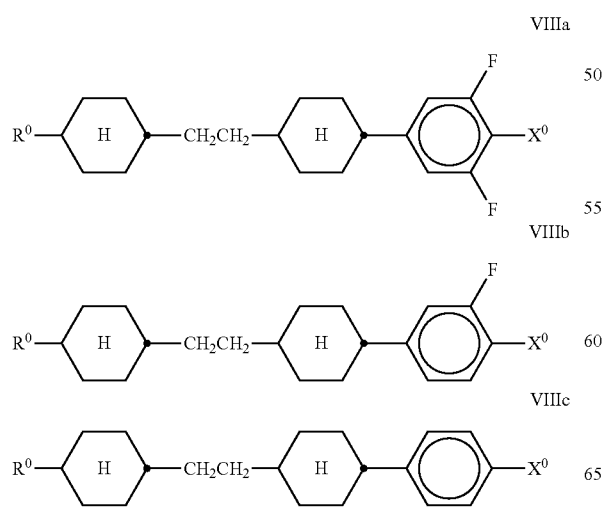

in which $R^0$ and $X^0$ have the meanings indicated for formula VII. Preferably, $R^0$ in formula VII denotes alkyl having 1 to 8 C atoms and $X^0$ denotes F, furthermore $OCF_3$.

The compounds of the formula VIII are preferably selected from the following formulae,

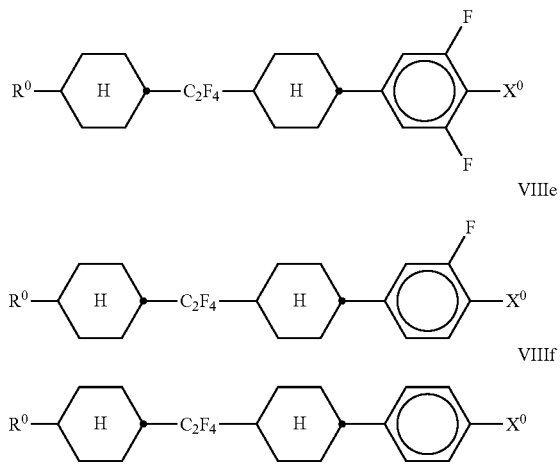

in which $R^0$ and $X^0$ have the meanings indicated for formula VIII. $R^0$ preferably denotes a straight-chain alkyl radical having 1 to 8 C atoms. $X^0$ preferably denotes F.

The medium additionally comprises one or more compounds of the following formula,

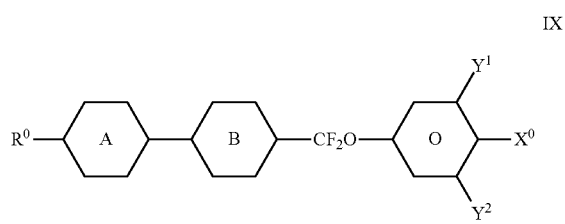

in which $R^0$, $X^0$, $Y^1$ and $Y^2$ each, independently of one another, have the meanings indicated for formula IV, and

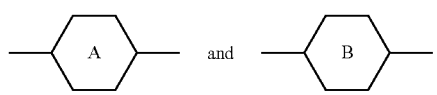

each, independently of one another, denote

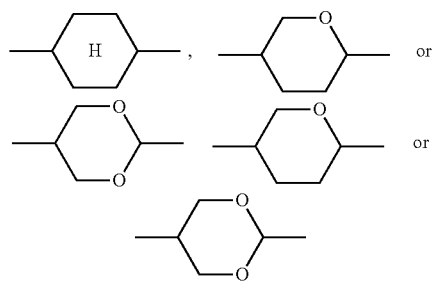

where rings A and B do not both simultaneously denote cyclohexylene;

The compounds of the formula IX are preferably selected from the following formulae,

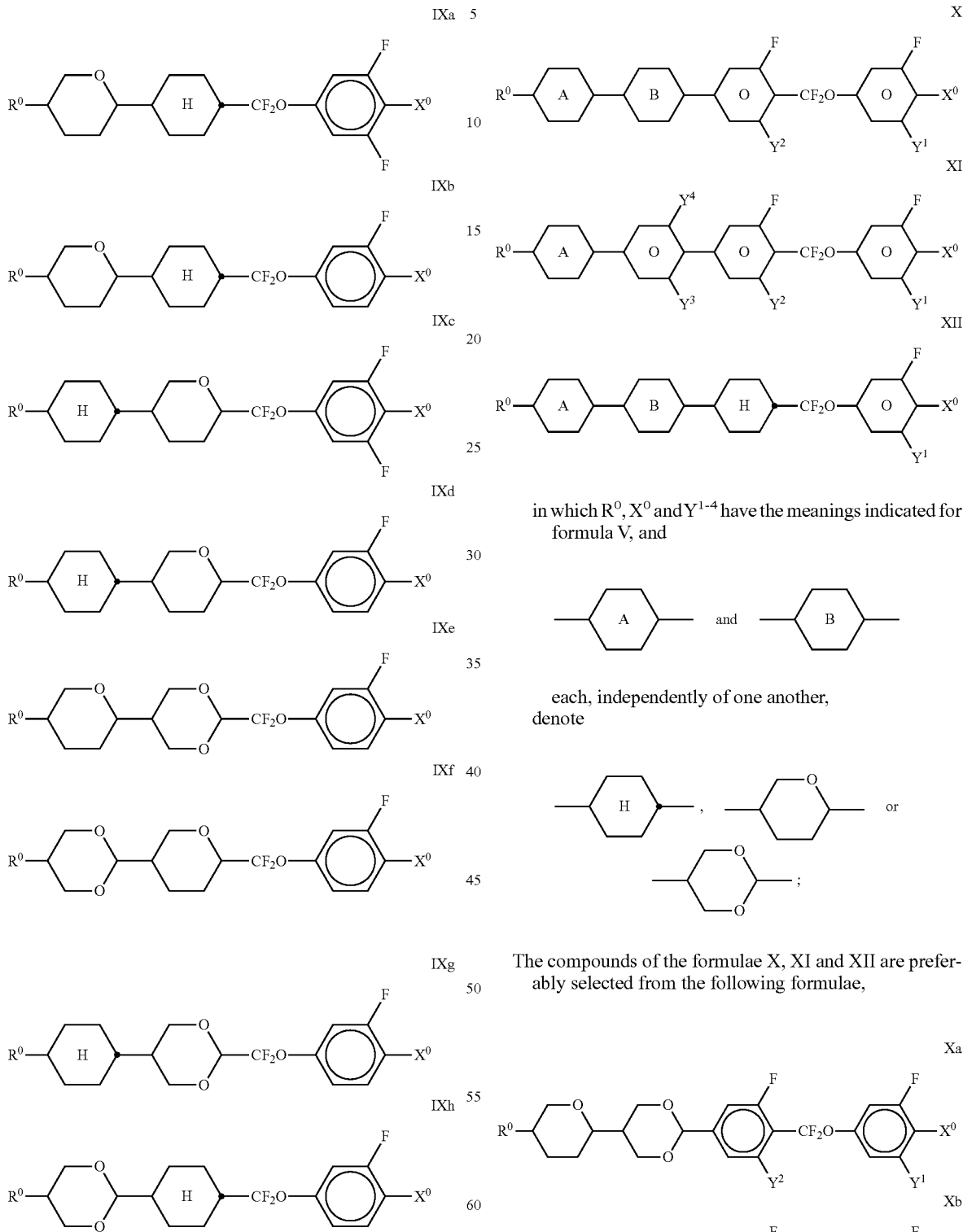

in which $R^0$ and $X^0$ have the meanings indicated for formula IX. Preferably, $R^0$ denotes alkyl having 1 to 8 C atoms and $X^0$ denotes F. Particular preference is given to compounds of the formula IXa;

The medium additionally comprises one or more compounds selected from the following formulae,

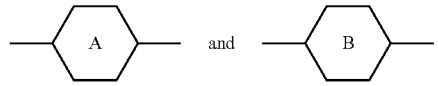

in which $R^0$, $X^0$ and $Y^{1-4}$ have the meanings indicated for formula V, and

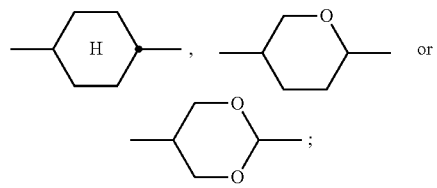

each, independently of one another, denote

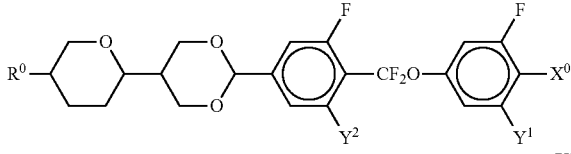

The compounds of the formulae X, XI and XII are preferably selected from the following formulae,

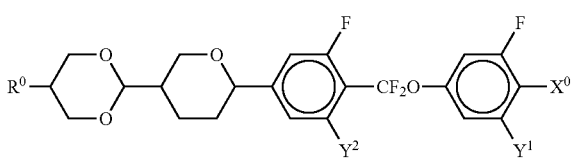

-continued

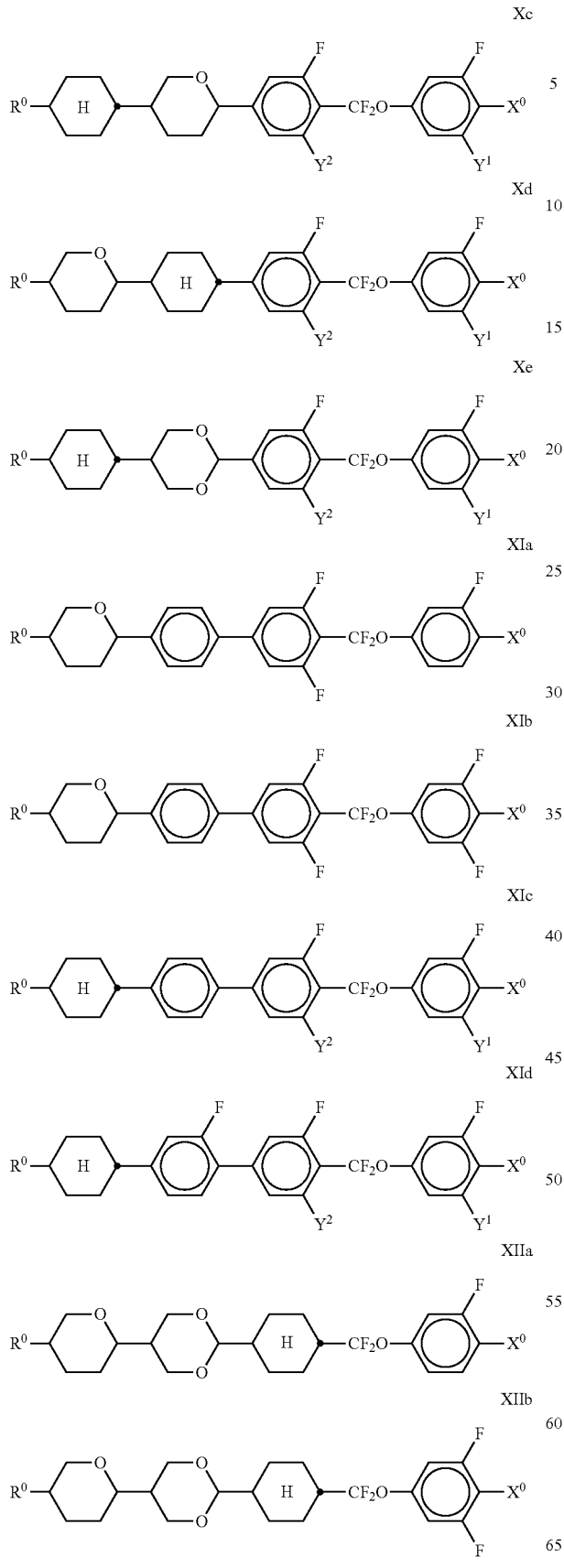

in which $R^0$ and $X^0$ have the meanings indicated for formula X, XI and XII. Preferably, $R^0$ denotes alkyl having 1 to 8 C atoms and $X^0$ denotes F. Particularly preferred compounds are those in which $Y^1$ denotes F and $Y^2$ denotes H or F, preferably F. Particular preference is given to media comprising one or more compounds of the formula XIb in which $X^0$=F.

The medium additionally comprises one or more compounds of the following formula,

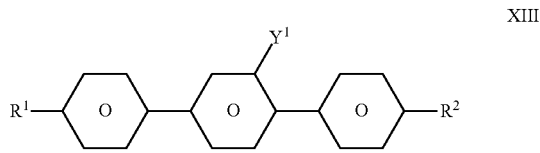

XIII in which $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^1$ denotes H or F.

Preferred compounds of the formula XIII are the compounds of the formula,

XIII-1

XIII-2

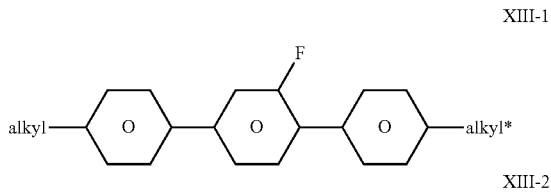

XIII-3

XIII-4

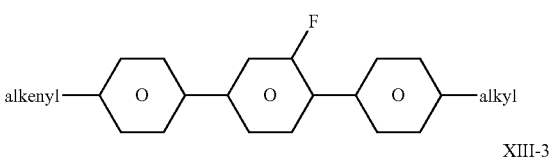

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Particular preference is given to media comprising one or more compounds of the formulae XIII-1 and/or XIII-3.

The medium additionally comprises one or more compounds selected from the following formulae,

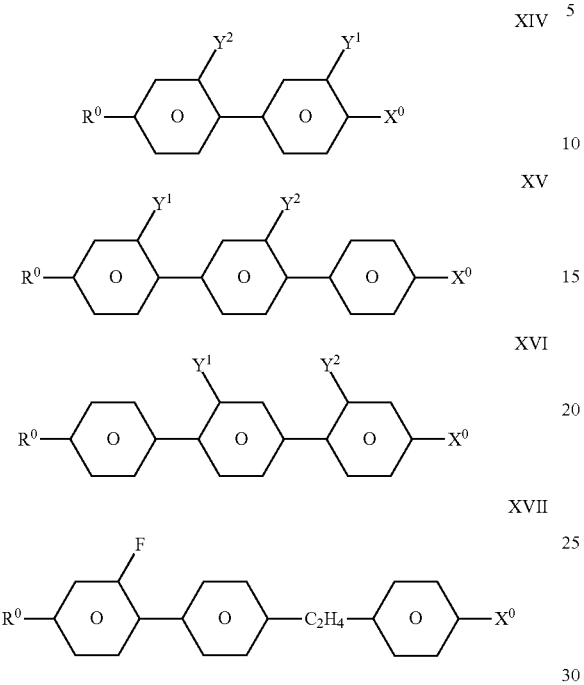

in which $R^0$, $X^0$, $Y^1$ and $Y^2$ have the meanings indicated for formula IV. Preferably, $R^0$ denotes alkyl having 1 to 8 C atoms and $X^0$ denotes F or Cl;

The compounds of the formulae XIV, XV and XVI are preferably selected from compounds of the formulae,

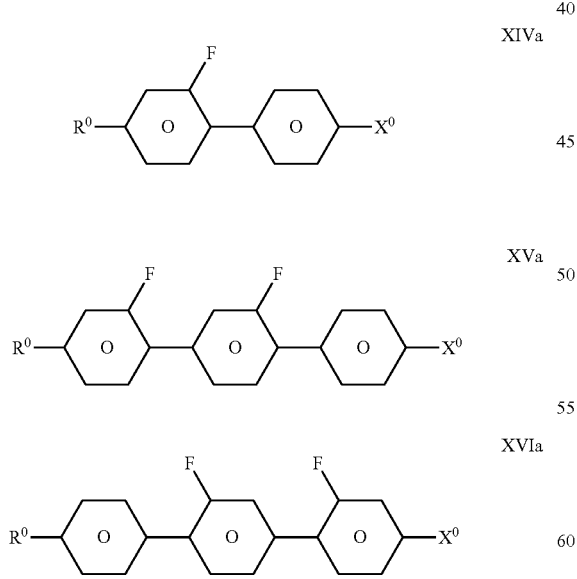

in which $R^0$ and $X^0$ have the meanings indicated for formula XIV, XV and XVI. $R^0$ preferably denotes alkyl having 1 to 8 C atoms. In the compounds of the formula XIV, $X^0$ preferably denotes F or Cl.

The medium additionally comprises one or more compounds of the following formulae D1 and/or D2,

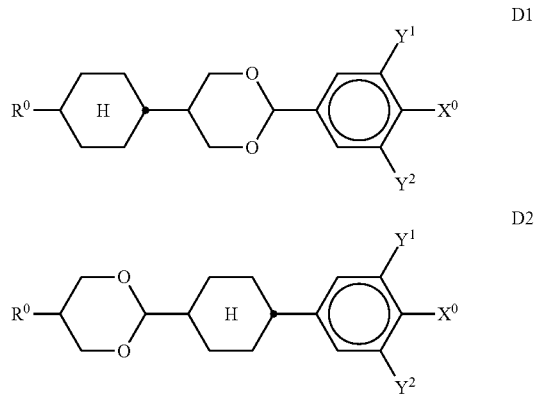

in which $Y^1$, $Y^2$, $R^0$ and $X^0$ have the meanings indicated for formula IV. Preferably, $R^0$ denotes alkyl having 1 to 8 C atoms and $X^0$ denotes F.

Particular preference is given to compounds of the formulae,

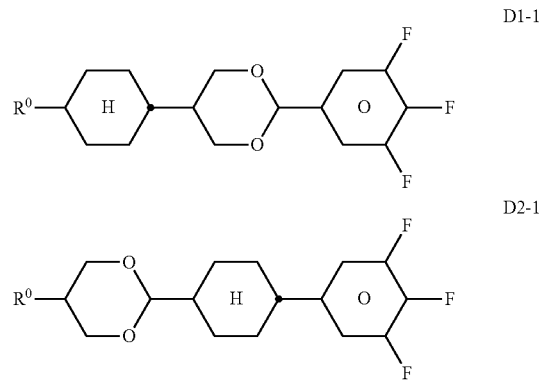

in which $R^0$ has the meaning indicated for formula IV and preferably denotes straight-chain alkyl having 1 to 6 C atoms, in particular $C_2H_5$, n-$C_3H_7$ or n-$C_5H_{11}$.

The medium additionally comprises one or more compounds of the following formula,

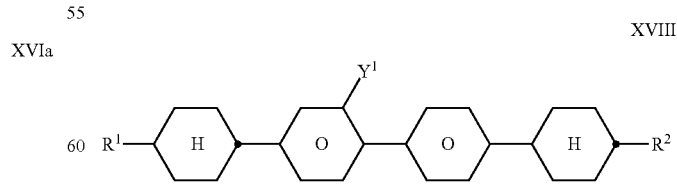

in which $Y^1$, $R^1$ and $R^2$ have the meanings indicated for formula XIII. $R^1$ and $R^2$ preferably each, independently of one another, denote alkyl having 1 to 8 C atoms;

The medium additionally comprises one or more compounds of the following formula,

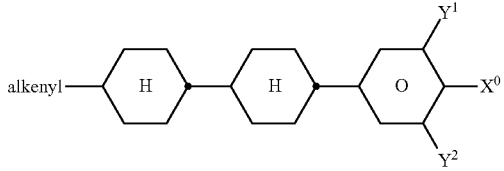
XIX in which $X^0$, $Y^1$ and $Y^2$ have the meanings indicated for formula IV, and "alkenyl" denotes $C_{2-7}$-alkenyl. Particular preference is given to compounds of the following formula:

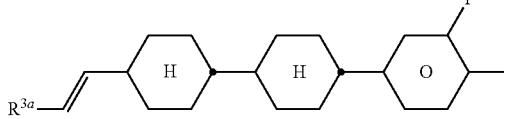
XIXa in which $R^{3a}$ has the meaning indicated above and preferably denotes H;

The medium additionally comprises one or more tetracyclic compounds selected from the formulae XX to XXVI,

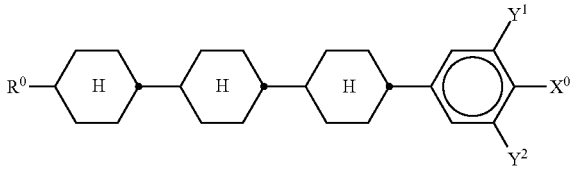
XX

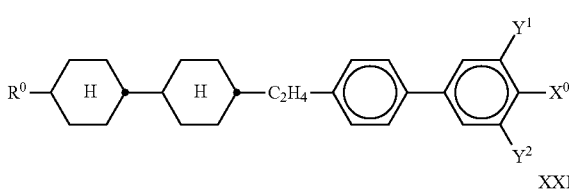
XXI

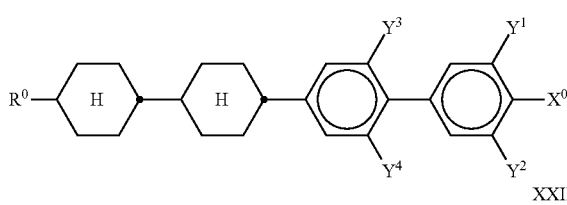
XXII

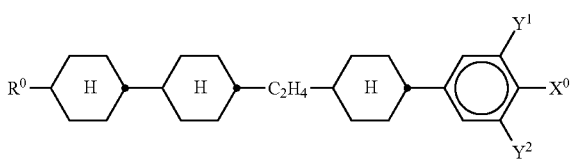
XXIII

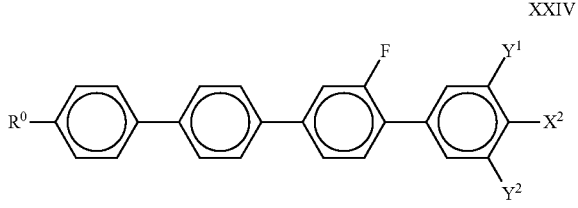
XXIV

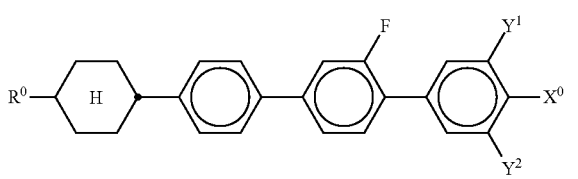
XXV

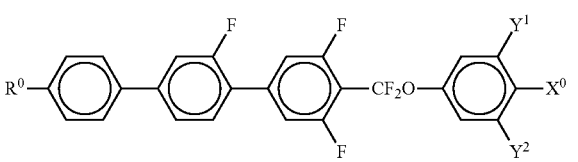
XXVI in which $Y^{1-4}$, $R^o$ and $X^0$ each, independently of one another, have the meanings indicated for formula V. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

Particularly preferred compounds of the formula XXII are those of the following formula

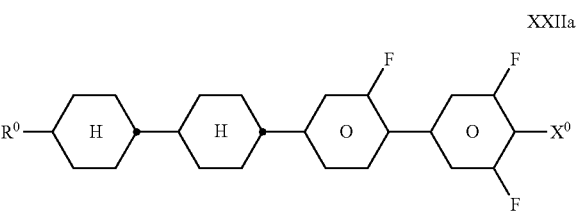
XXIIa in which $R^0$ and $X^0$ have the meanings indicated for formula XXII, and $X^0$ preferably denotes F.

The compound of the formula XXII is preferably employed in amounts of 0.5-20% by weight, in particular 1-10% by weight;

Particularly preferred compounds of the formula XXV are those of the following formula

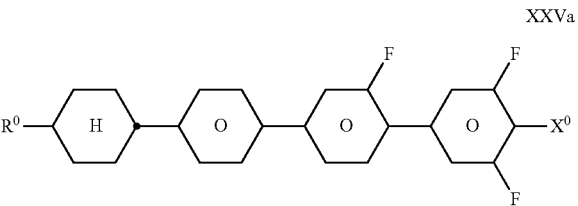
XXVa in which $R^0$ and $X^0$ have the meanings indicated for formula XXV, and $X^0$ preferably denotes F or $OCF_3$.

The compound of the formula XXV is preferably employed in amounts of 1-20% by weight, in particular 2-15% by weight;

Particularly preferred compounds of the formula XXVI are those of the following formula,

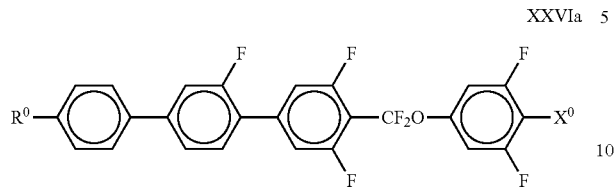

XXVIa in which R⁰ and X⁰ have the meanings indicated for formula XXVI, and X⁰ preferably denotes F.

The compound of the formula XXVI is preferably employed in amounts of 0.5-50% by weight, in particular 4-35% by weight;

The medium additionally comprises one or more compounds of the following formula:

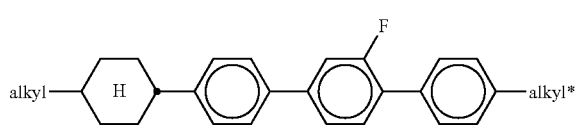

XXVII in which alkyl and alkyl* each, independently of one another, denote a straight-chain alkyl radical having 1 to 6 C atoms.

Particularly preferred compounds of the formula XXVII are selected from the following formulae

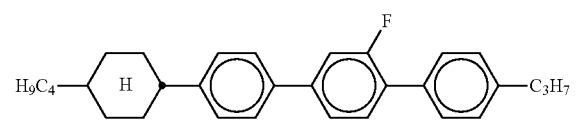

XXVIIa

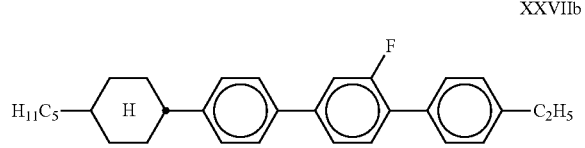

XXVIIb

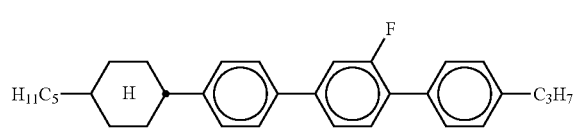

XXVIIc

The compound of the formula XXVII is preferably employed in amounts of 0.5-30% by weight, in particular 3-25% by weight;

The medium additionally comprises one or more compounds of the following formula,

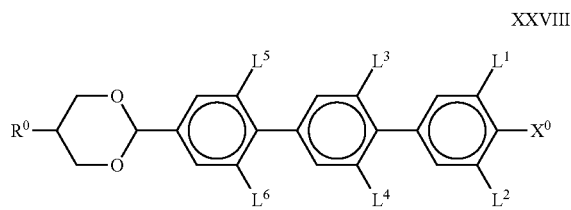

XXVIII in which R⁰ and X⁰ have the meanings indicated for formula IV, and L¹ to L⁶ each, independently of one another, denote H or F, where preferably at least one of the radicals L¹, L³ and L⁵ denotes F.

Particularly preferred compounds of the formula XXVIII are selected from the following formulae,

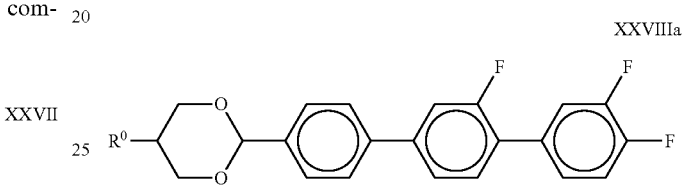

XXVIIIa

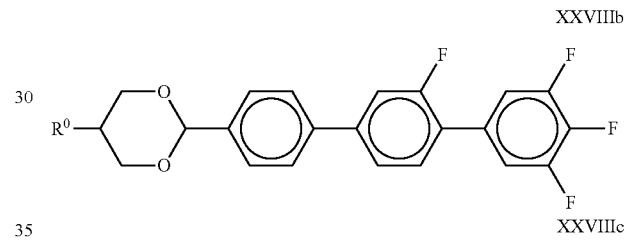

XXVIIIb

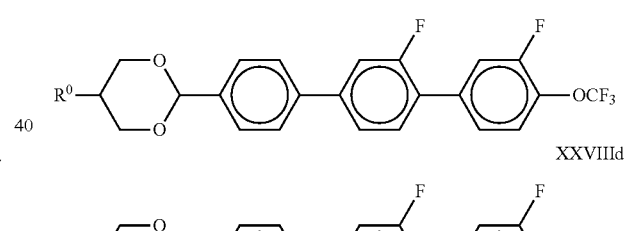

XXVIIIc

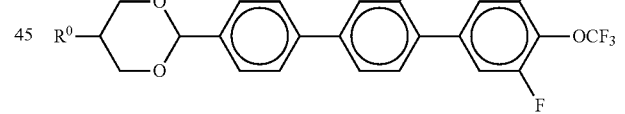

XXVIIId in which R⁰ has the meaning indicated for formula XXVIII and preferably denotes straight-chain alkyl. Particular preference is given to the compounds of the formulae XXVIIb and XXVIIId, preferably in which R⁰ denotes C₂H₅, n-C₃H₇ or n-C₅H₁₁.

The compound of the formula XXVIII is preferably employed in amounts of 0.5-30% by weight, in particular 3-25% by weight;

The medium additionally comprises one or more compounds of the following formula,

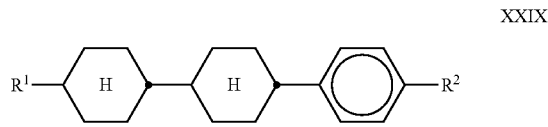

XXIX in which $R^1$ and $R^2$ have the meanings indicated for formula XIII. $R^1$ and $R^2$ preferably each, independently of one another, denote alkyl having 1 to 8 C atoms.

The compound of the formula XXIX is preferably employed in amounts of 0.5-30% by weight, in particular 1-10% by weight;

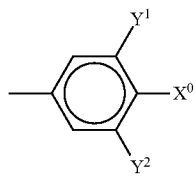

is preferably

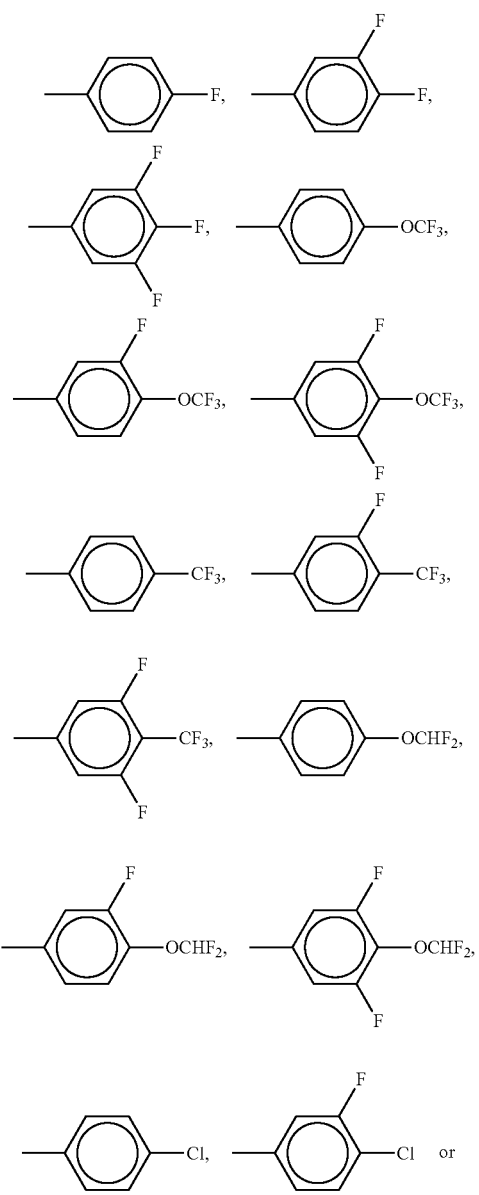

$R^0$ is preferably straight-chain alkyl or alkenyl having 2 to 7 C atoms;

$X^0$ is preferably F, furthermore $OCF_3$, $C_1$ or $CF_3$;

The medium preferably comprises one, two or three compounds of the formula I;

The medium preferably comprises one or more compounds selected from the group consisting of compounds of the formulae I, II, III, VI-1, VII, XI, XIII, XVIII, XXII, XXV, XXVI, XXIX;

The medium preferably comprises one or more compounds of the formula II and/or III;

The medium preferably comprises one or more compounds of the formula XXVI;

The medium preferably comprises 1-25% by weight, particularly preferably 2-20% by weight, of compounds of the formula I;

The proportion of compounds of the formulae II-XXIX in the mixture as a whole is preferably 75 to 99% by weight;

The medium preferably comprises 20-80% by weight, particularly preferably 25-70% by weight, of compounds of the formula II and/or III;

The medium preferably comprises 2-25% by weight, particularly preferably 3-15% by weight, of compounds of the formula VI-1;

The medium preferably comprises 1-20% by weight, particularly preferably 2-15% by weight, of compounds of the formula VII;

The medium preferably comprises 1-20% by weight, particularly preferably 2-15% by weight, of compounds of the formula XI;

The medium preferably comprises 5-40% by weight, particularly preferably 7-30% by weight, of compounds of the formula XIII;

The medium preferably comprises 1-20% by weight, particularly preferably 2-15% by weight, of compounds of the formula XXII;

The medium preferably comprises 2-25% by weight, particularly preferably 3-15% by weight, of compounds of the formula XXV;

The medium preferably comprises 3-45% by weight, particularly preferably 4-35% by weight, of compounds of the formula XXVI;

The medium preferably comprises 2-25% by weight, particularly preferably 3-15% by weight, of compounds of the formula XXVIII;

The medium preferably comprises 1-20% by weight, particularly preferably 1-10% by weight, of compounds of the formula XXIX;

The medium preferably comprises no compounds of the formula VI-2a as indicated above;

The medium preferably comprises no compounds of the formula VI-2 as indicated above.

It has been found that even a relatively small proportion of compounds of the formula I mixed with conventional liquid-crystal materials, but in particular with one or more compounds of the formulae II to XXIX, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" in this application encompasses straight-chain and branched alkenyl groups having 2-7 carbon atoms, in particular the straight-chain groups. Preferred alkenyl groups are $C_2$-$C_7$1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1Ebutenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application encompasses straight-chain groups having at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^o$ and $X^o$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formula IV to VIII in which $X^o$ denotes F, $OCF_3$, $OCHF_2$, $OCH=CF_2$, $OCF=CF_2$ or $OCF_2$—$CF_2H$. A favourable synergistic action with the compounds of the formula I results in particularly advantageous properties. In particular, mixtures comprising compounds of the formulae I, VI and XI are distinguished by their low threshold voltages.

The individual compounds of the above-mentioned formulae and the subformulae thereof which can be used in the media according to the invention are either known or can be prepared analogously to the known compounds.

The invention also relates to electro-optical displays, such as, for example, TN, STN, FFS, OCB, IPS, TN-TFT or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-$\Delta n$ TFT applications, such as, for example, PDAs, notebooks, LCD TVs and monitors.

The liquid-crystal mixtures according to the invention, while retaining the nematic phase down to $-20°$ C. and preferably down to $-30°$ C., particularly preferably down to $-40°$ C., and the clearing point $\geq 70°$ C., preferably $\geq 75°$ C., at the same time allow rotational viscosities $\gamma_1$ of $\leq 120$ mPa·s, particularly preferably 100 mPa·s, to be achieved, enabling excellent MLC displays having fast response times to be achieved.

The dielectric anisotropy $\Delta\in$ of the liquid-crystal mixtures according to the invention is preferably $\geq +5$, particularly preferably $\geq +10$. In addition, the mixtures are characterised by low operating voltages. The threshold voltage of the liquid-crystal mixtures according to the invention is preferably $\leq 1.5$ V, in particular $\leq 1.2$ V. The birefringence $\Delta n$ of the liquid-crystal mixtures according to the invention is preferably $\geq 0.10$, particularly preferably $\geq 0.11$.

The nematic phase range of the liquid-crystal mixtures according to the invention preferably has a width of at least 90°, in particular at least 1000. This range preferably extends at least from $-25°$ C. to $+70°$ C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having higher $\Delta\in$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds.

Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyanophenylcyclohexanes of the formula

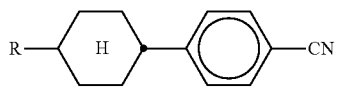

or esters of the formula

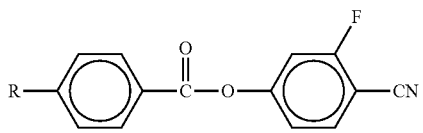

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXVII or with further liquid-crystalline compounds and/or additives. In general, the desired amount of the components used in the smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^1$, $R^{2*}$ $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

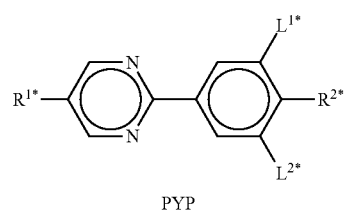

PYP

TABLE A-continued
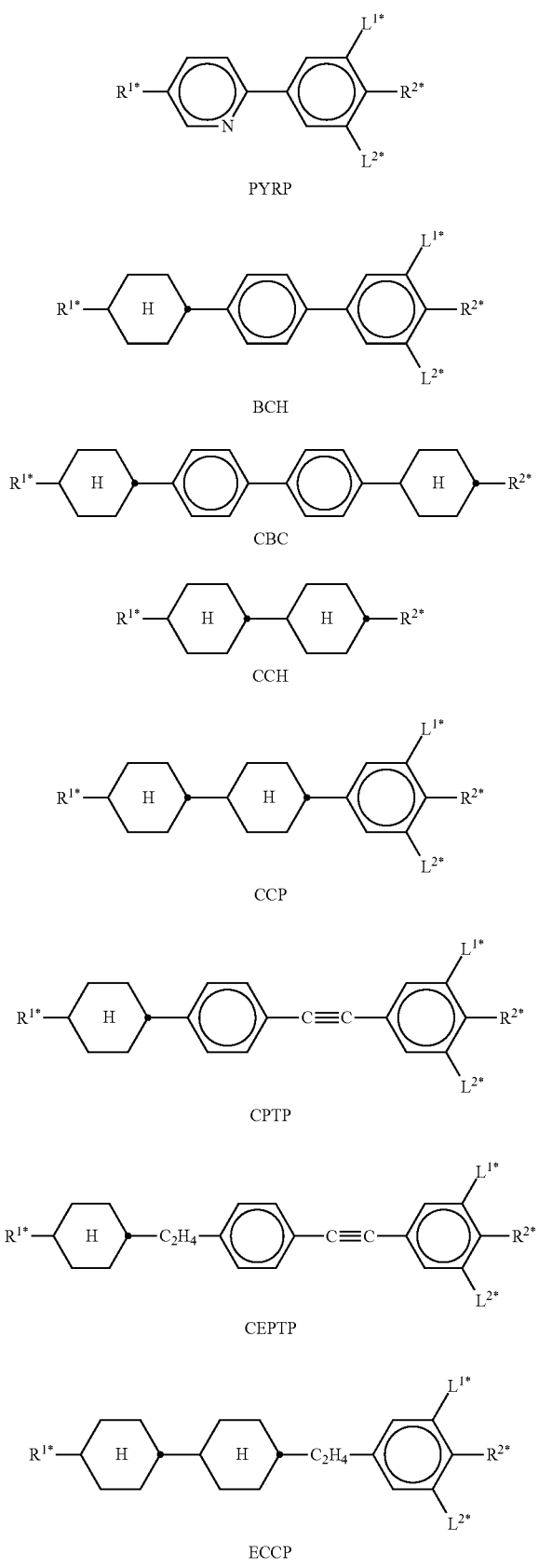
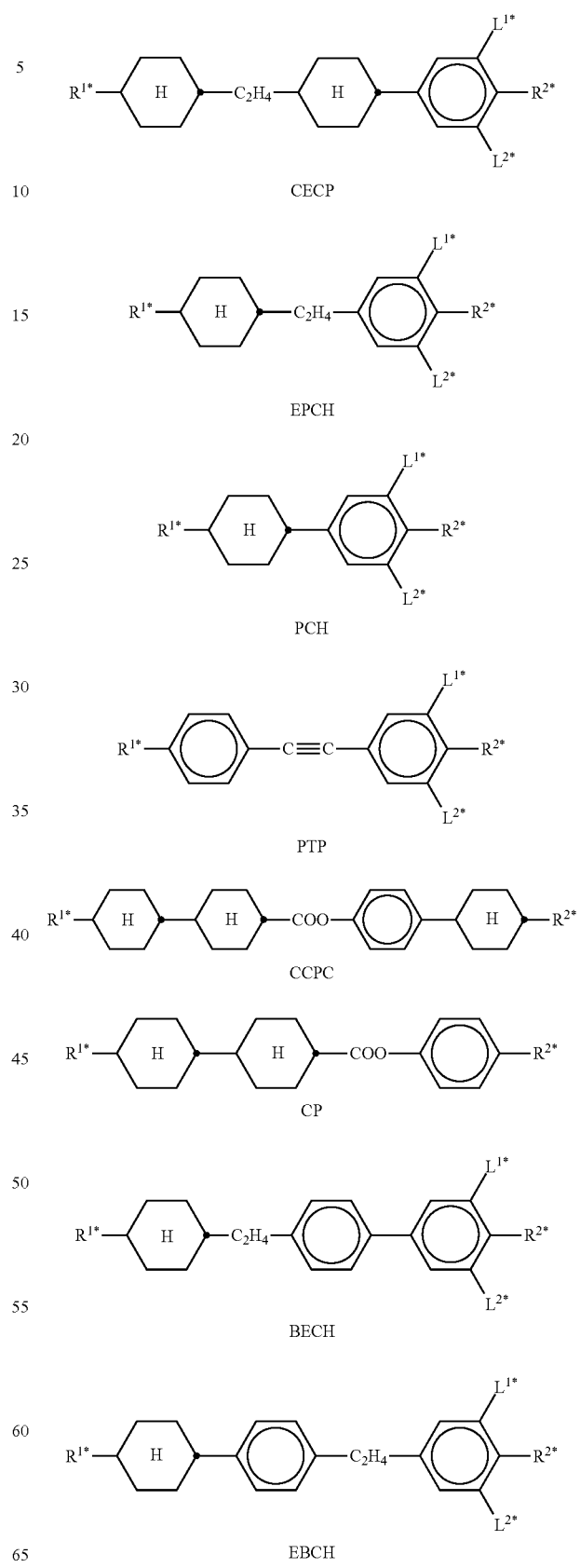

TABLE A-continued
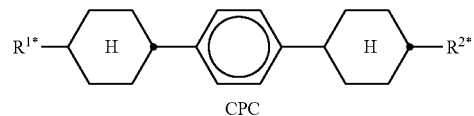
CPC
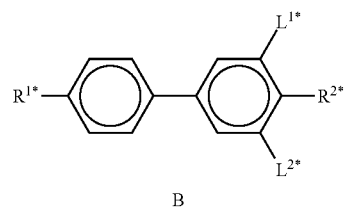
B
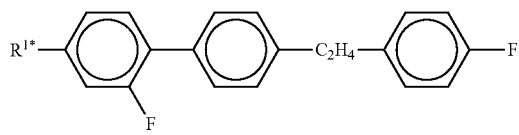
FET-nF
TABLE A-continued
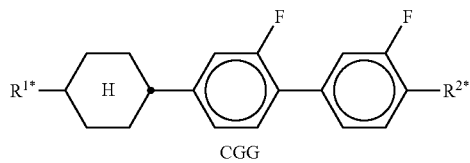
CGG
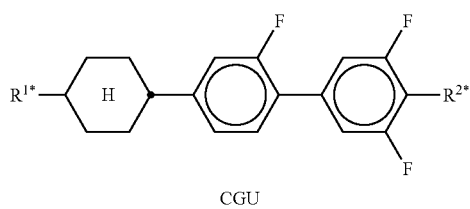
CGU
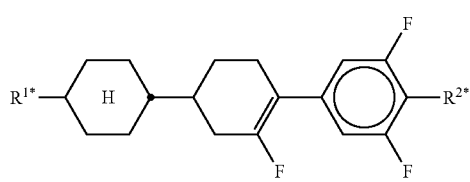
CFU
TABLE B
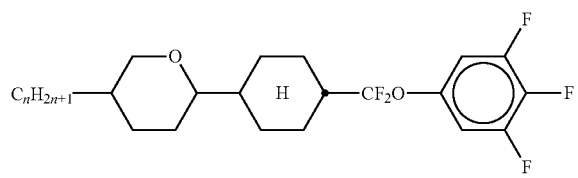
ACQU-n-F
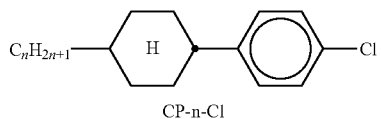
CP-n-Cl
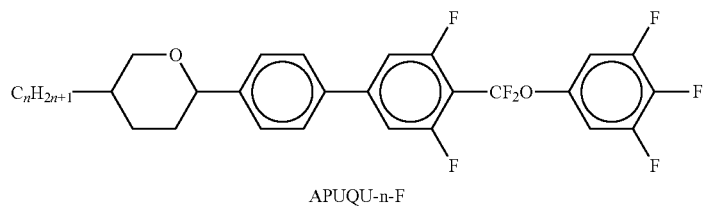
APUQU-n-F
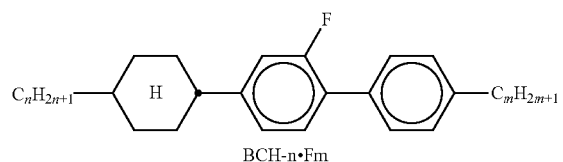
BCH-n·Fm TABLE B-continued
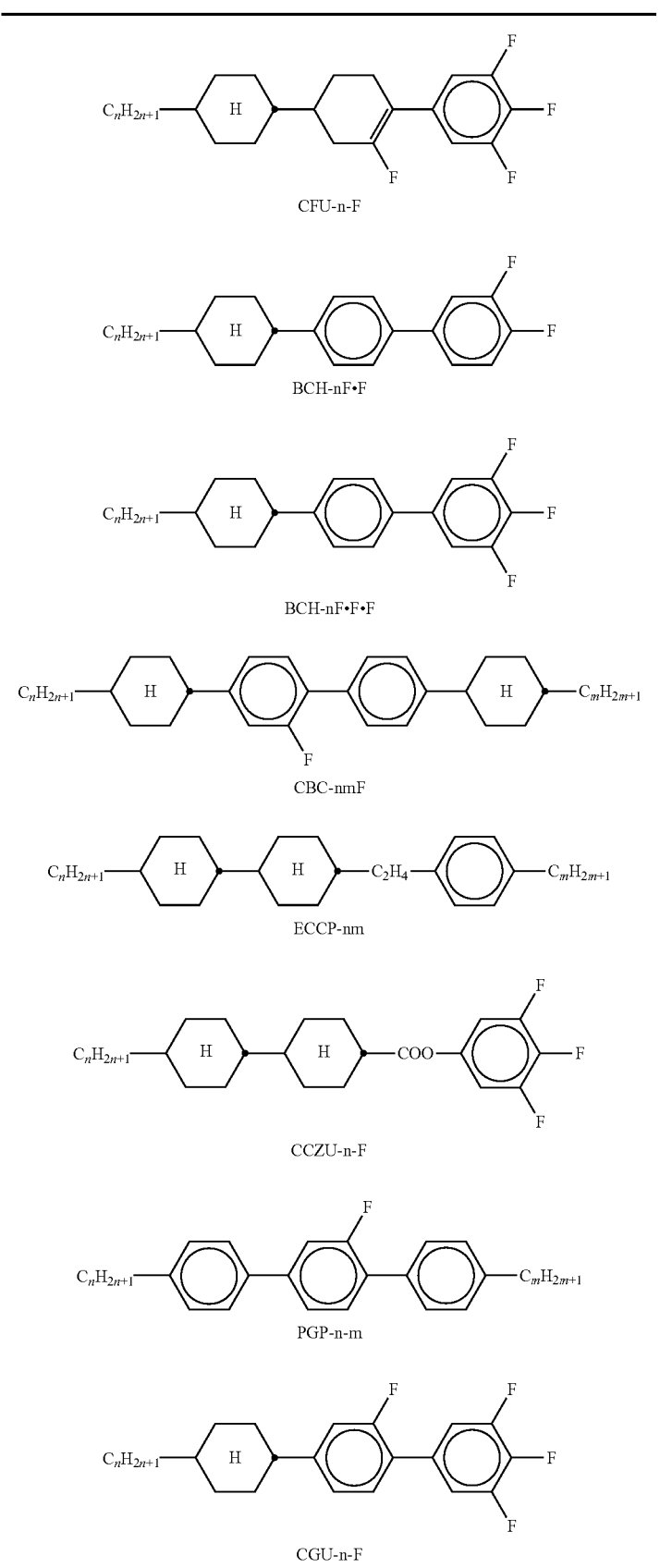

TABLE B-continued
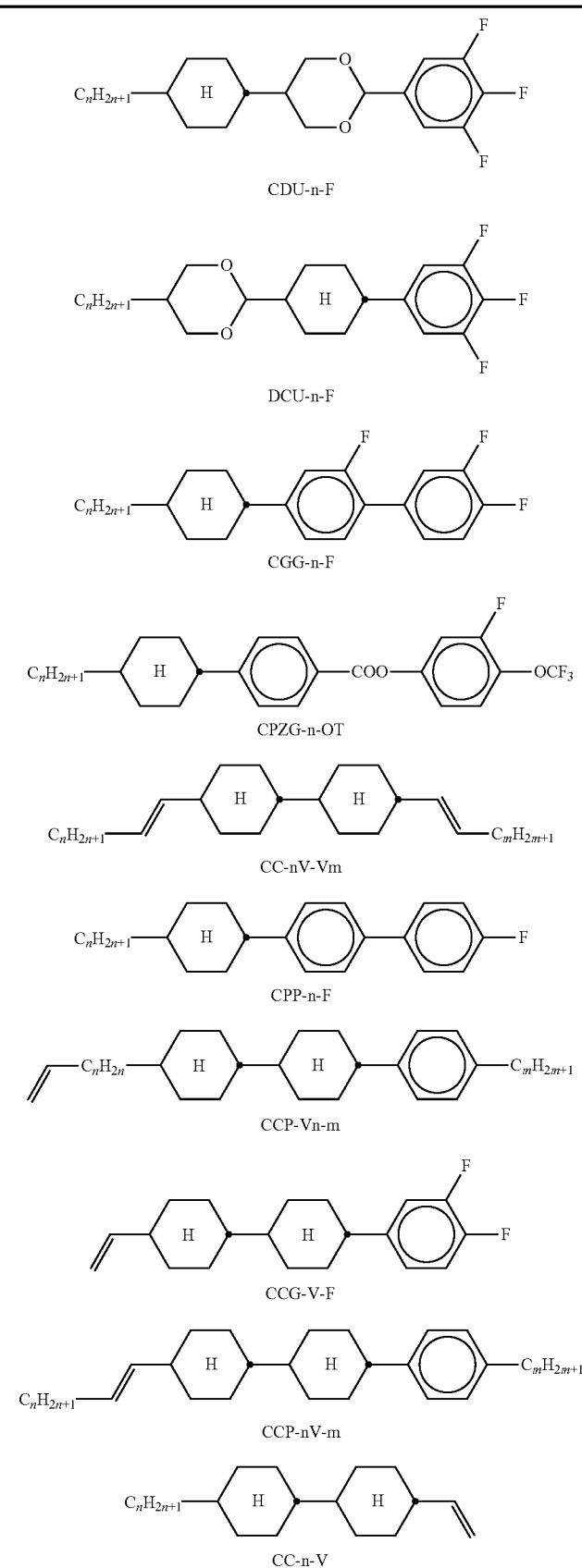

TABLE B-continued
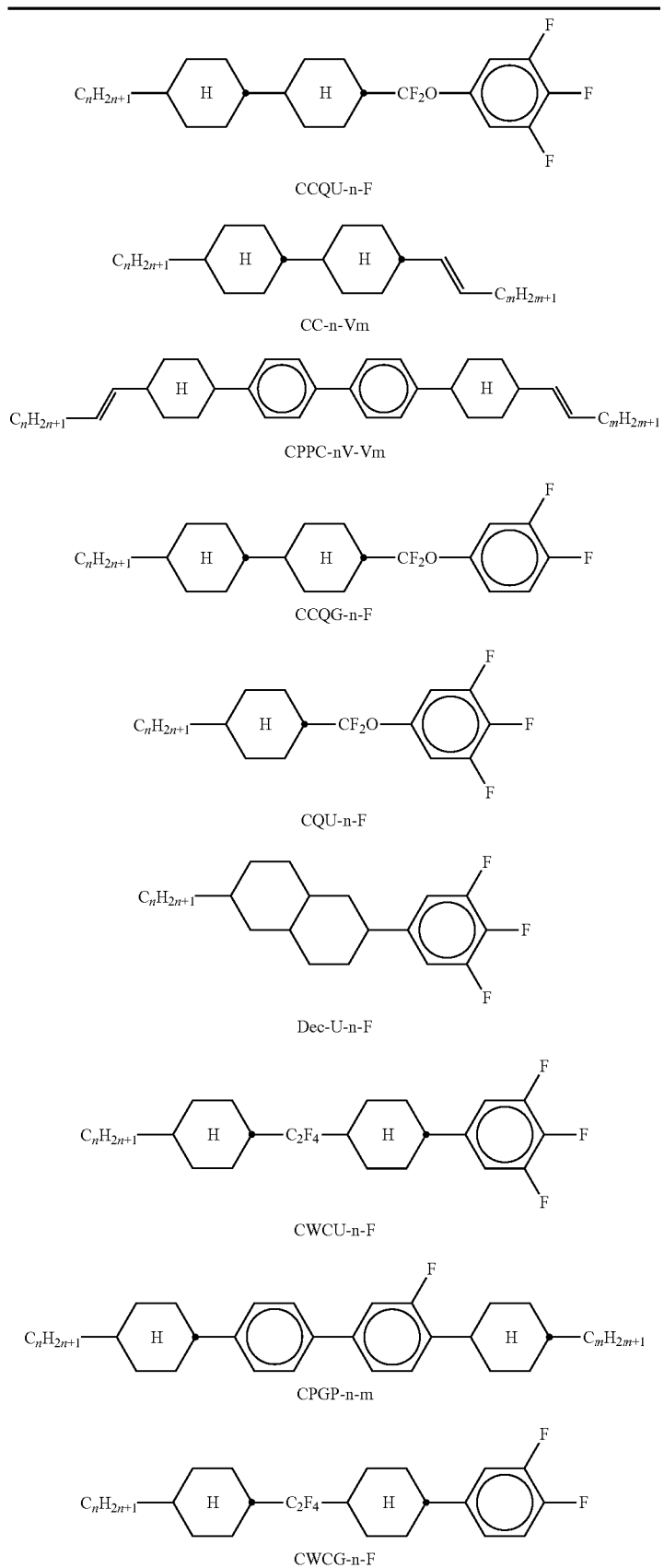

TABLE B-continued
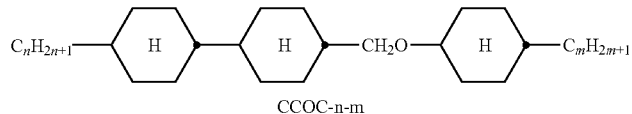
CCOC-n-m
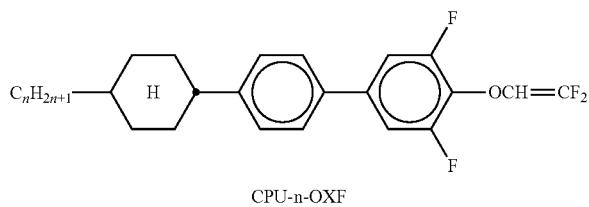
CPU-n-OXF
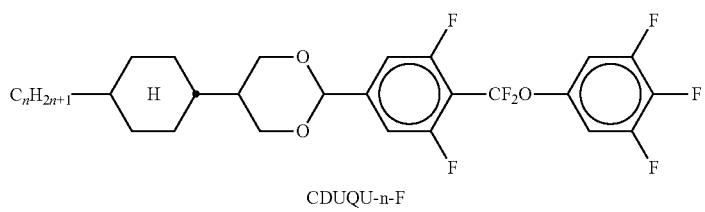
CDUQU-n-F
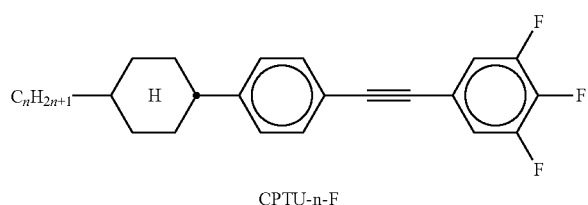
CPTU-n-F
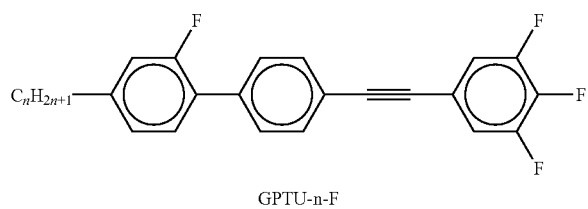
GPTU-n-F
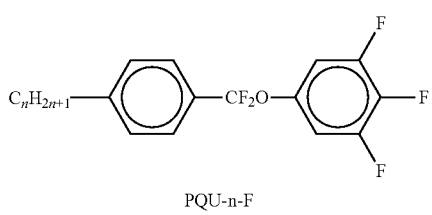
PQU-n-F
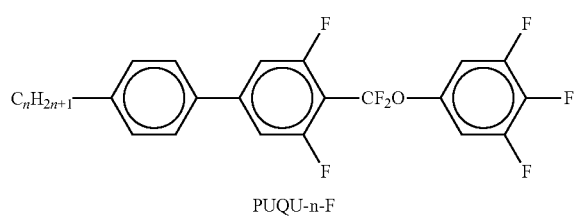
PUQU-n-F
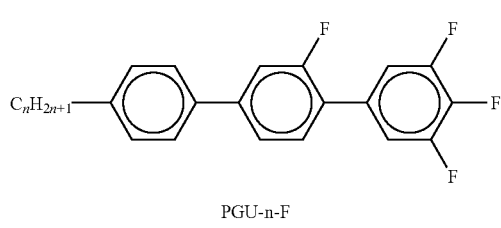
PGU-n-F TABLE B-continued
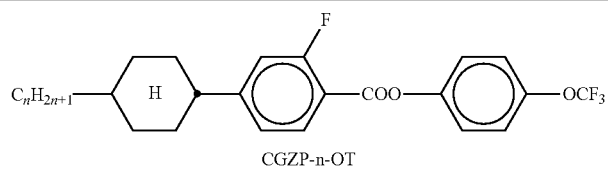
CGZP-n-OT
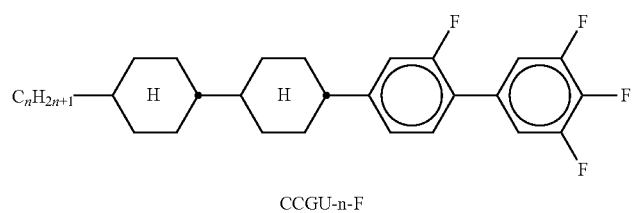
CCGU-n-F
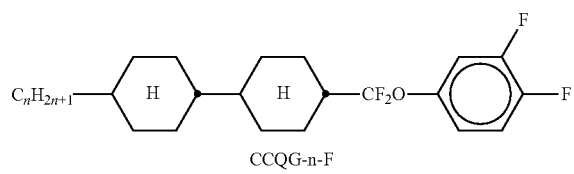
CCQG-n-F
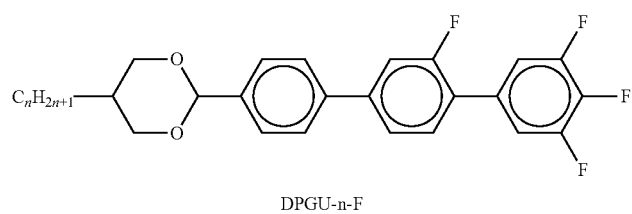
DPGU-n-F
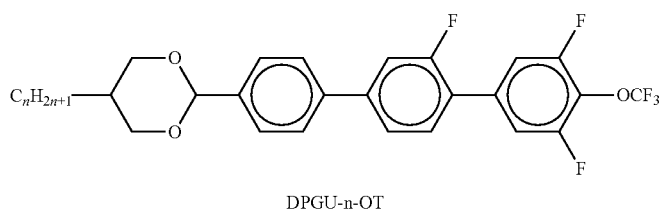
DPGU-n-OT
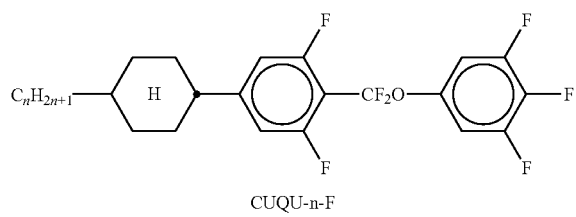
CUQU-n-F
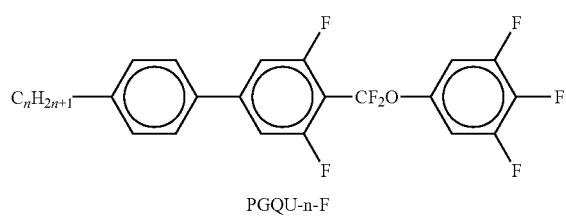
PGQU-n-F TABLE B-continued
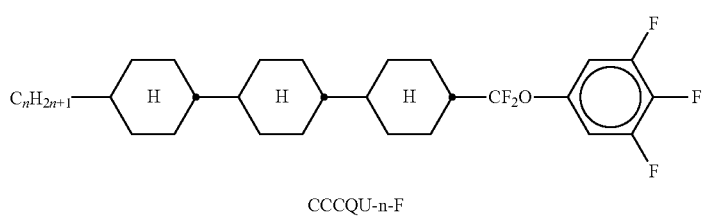
CCCQU-n-F
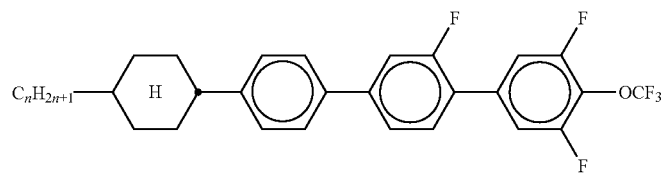
CPGU-n-OT
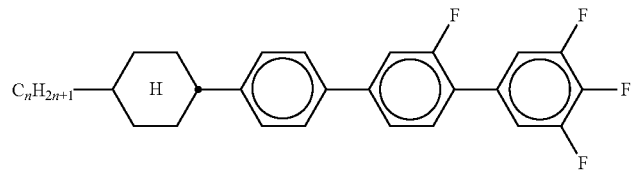
CPGU-n-F
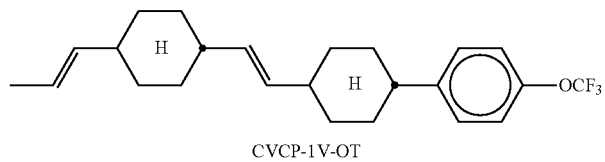
CVCP-1V-OT
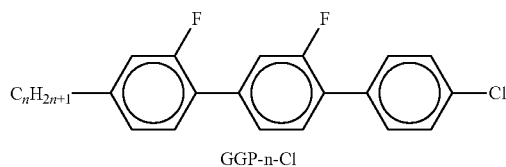
GGP-n-Cl
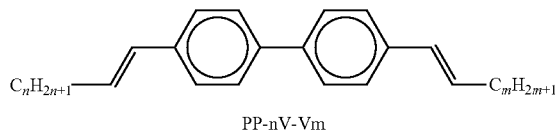
PP-nV-Vm
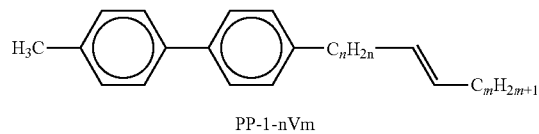
PP-1-nVm
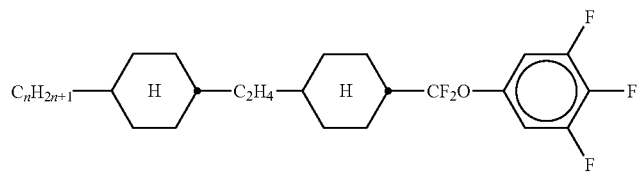
CWCQU-n-F TABLE B-continued
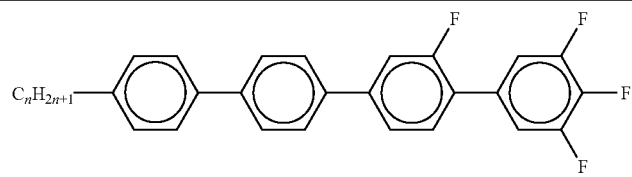
PPGU-n-F
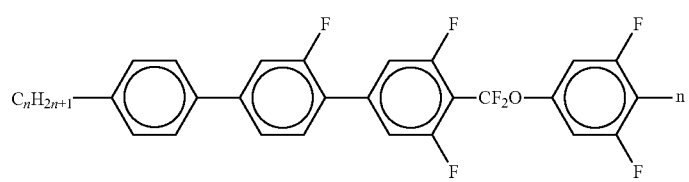
PGUQU-n-F
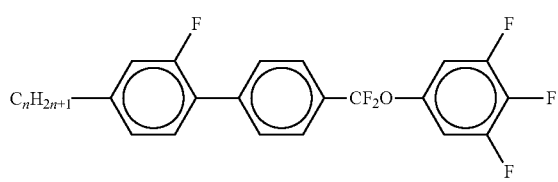
GPQU-n-F
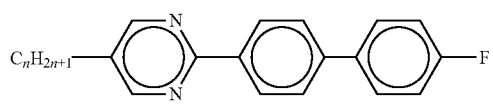
MPP-n-F
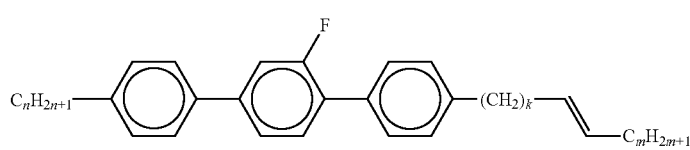
PGP-n-kVm
PP-n-kVm
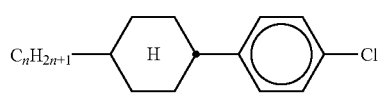
PCH-nCl
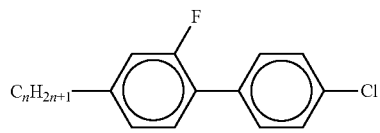
GP-n-Cl
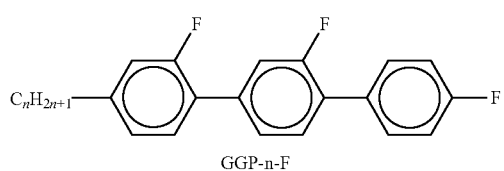
GGP-n-F TABLE B-continued
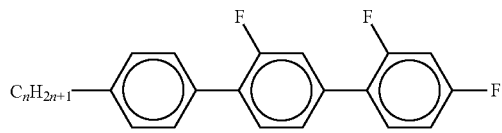
PGIGI-n-F
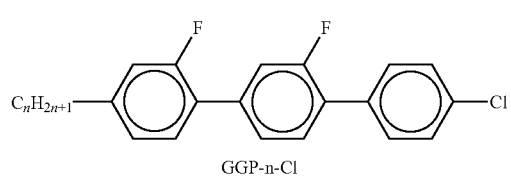
GGP-n-Cl
Particular preference is given to liquid-crystalline mixtures which, besides the compounds of the formula I, comprise at least one, two, three, four or more compounds from Table B.
TABLE C
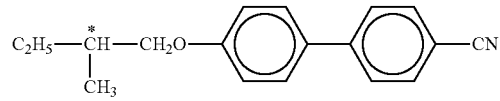
C 15
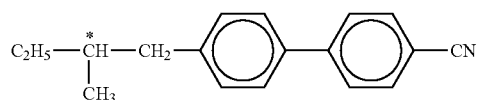
CB 15
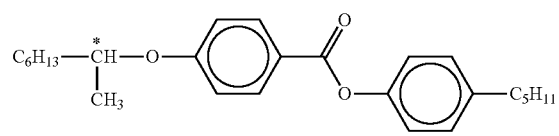
CM 21
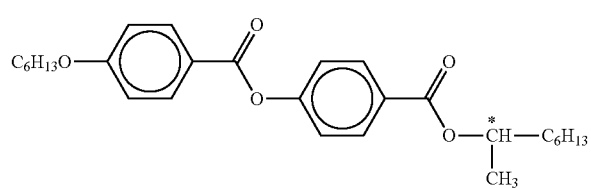
R/S-811
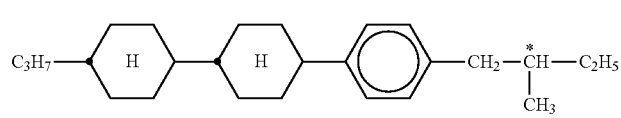
CM 44
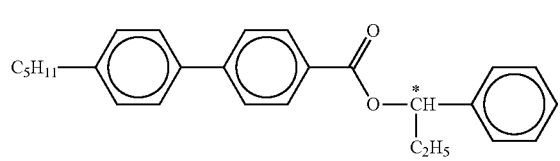
CM 45

TABLE C-continued
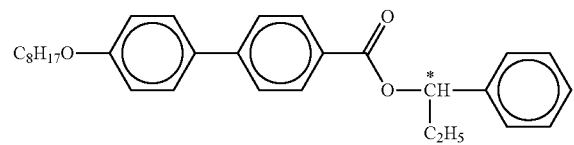
CM 47
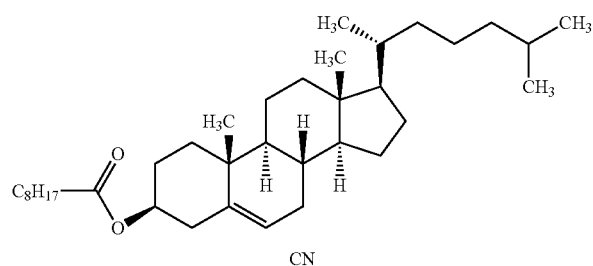
CN
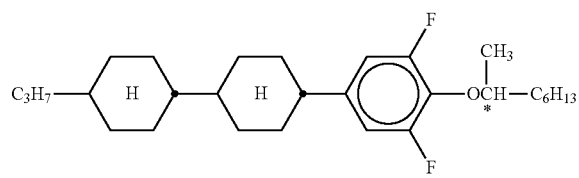
R/S-2011
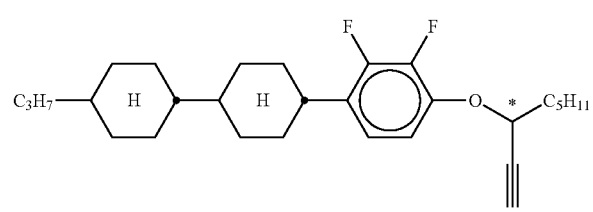
R/S-3011
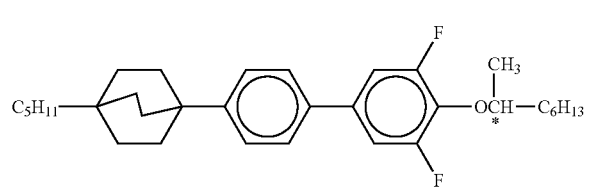
R/S-4011
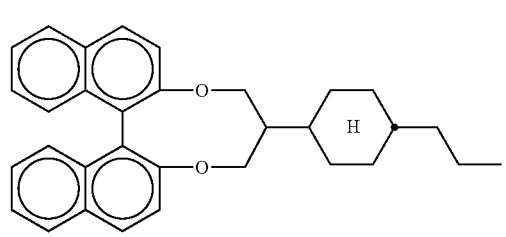
R/S-5011
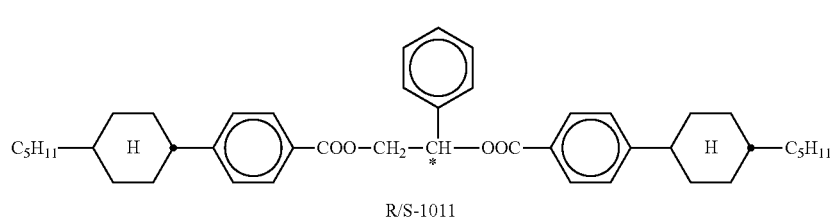
R/S-1011

Table C indicates possible dopants which are generally added to the mixtures according to the invention. The mixtures preferably comprise 0-10% by weight, in particular 0.01-5% by weight and particularly preferably 0.01-3% by weight, of dopants.

TABLE D

[Chemical structure: 2,2'-methylenebis(4-hydroxy-5-tert-butyl-toluene) type — two phenol rings connected by CH₂, each with methyl and tert-butyl substituents]

[Chemical structure: similar bisphenol connected by CH with isopropyl group]

[Chemical structure: similar bisphenol connected by S (sulfide)]

[Chemical structure: $C_nH_{2n+1}$—cyclohexyl—phenol with two tert-butyl groups and OH]

[Chemical structure: $C_nH_{2n+1}$—phenol with two tert-butyl groups—OH, where n = 1, 2, 3, 4, 5, 6 or 7]

[Chemical structure: 2,4,6-tri-tert-butylphenol with OH]

TABLE D-continued

[Chemical structure: $C_nH_{2n+1}O$—phenol with two tert-butyl groups—OH]

[Chemical structure: bisphenol with four tert-butyl groups connected by CH₂]

[Chemical structure: methyl 3,5-di-tert-butyl-4-hydroxybenzoate]

[Chemical structure: $H_{37}C_{18}$—COO—$C_2H_4$—phenol with two tert-butyl groups—OH]

[Chemical structure: 3,3',5,5'-tetra-tert-butyl-4,4'-biphenol]

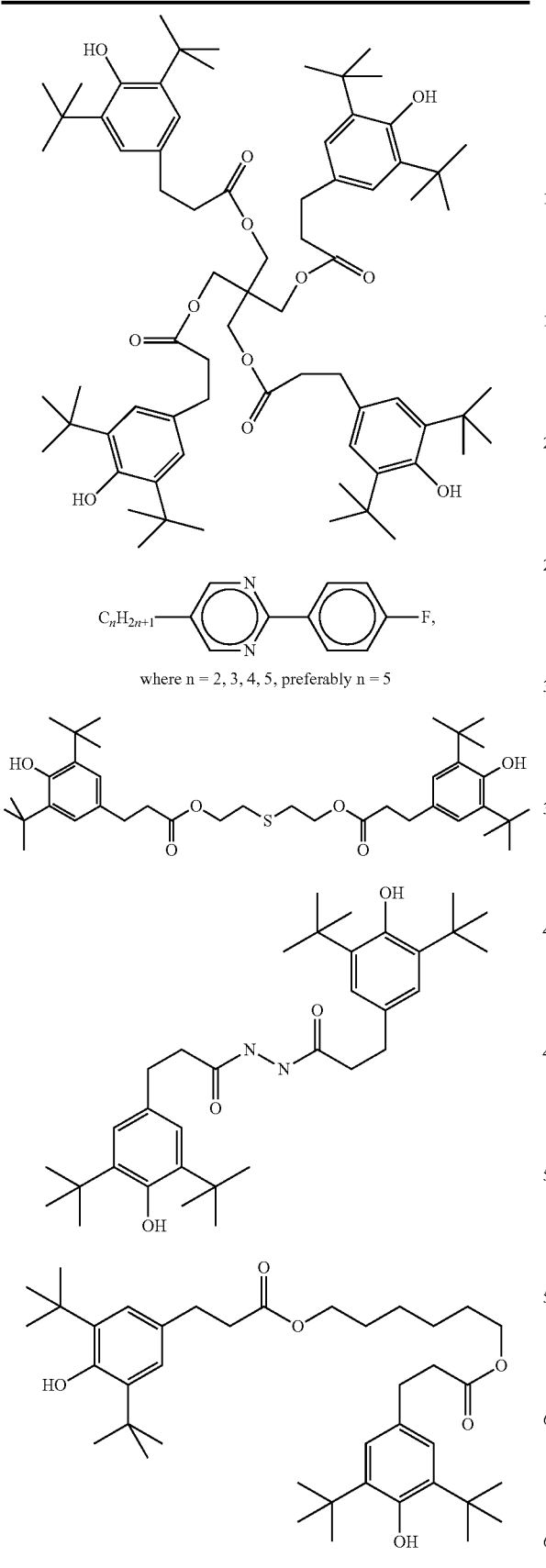
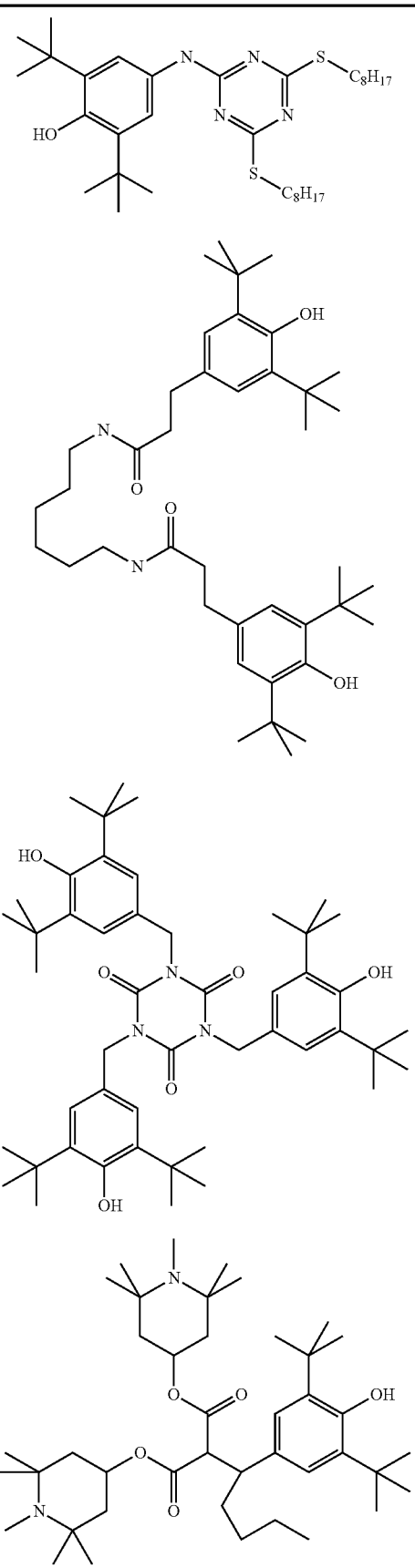

TABLE D-continued
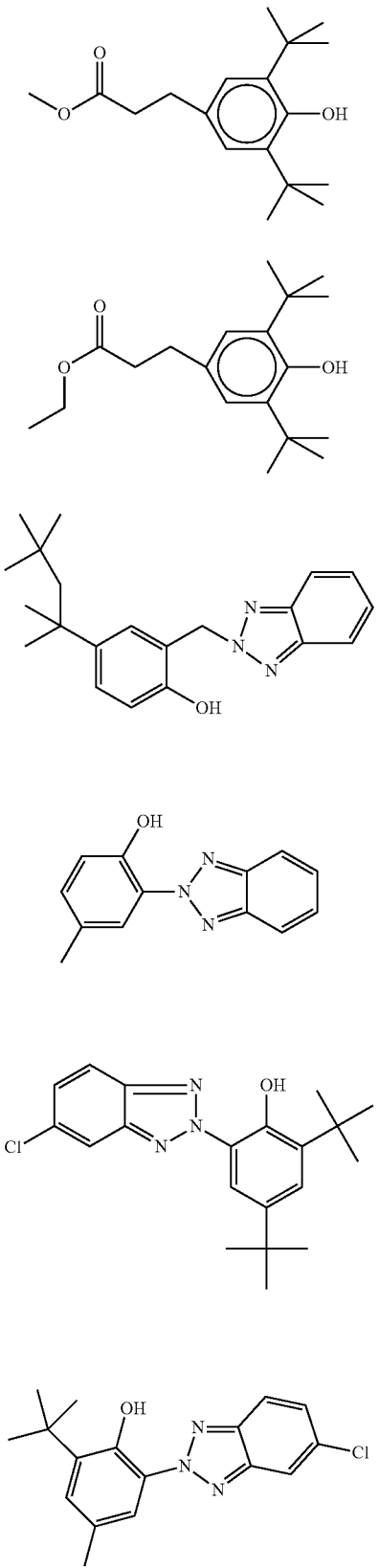
TABLE D-continued
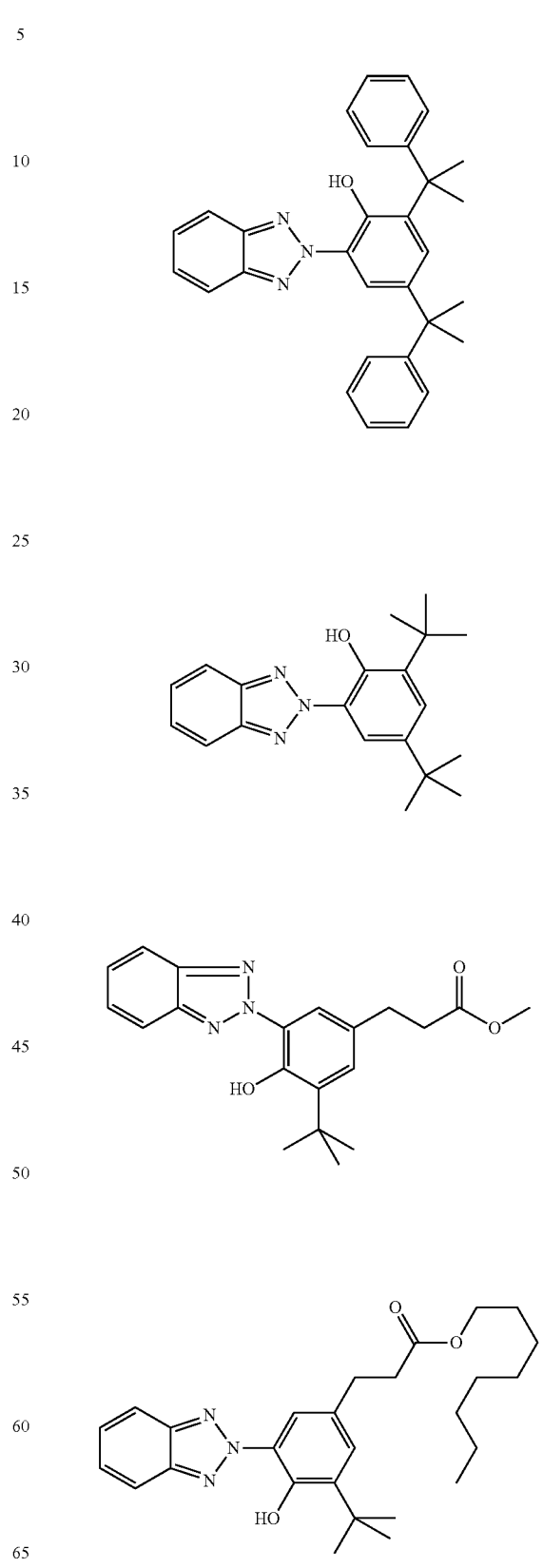

TABLE D-continued

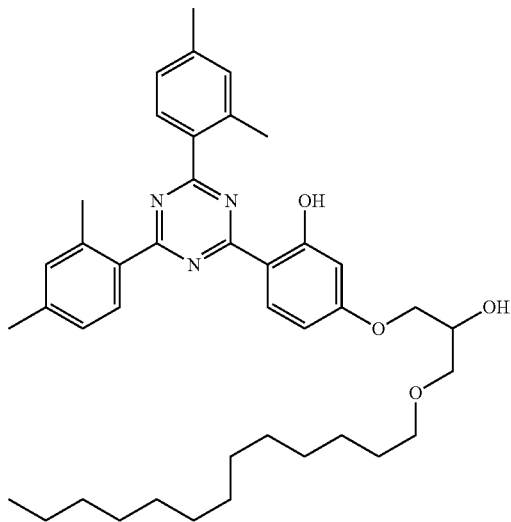 [SMILES: CCCCCCCCCCCCOCC(O)COc1ccc(-c2nc(-c3ccc(C)cc3C)nc(-c3ccc(C)cc3C)n2)c(O)c1]

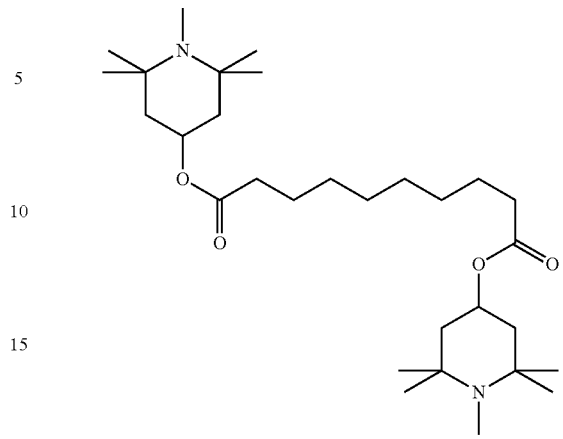

Stabilisers which can be added, for example, to the mixtures according to the invention in amounts of 0-10% by weight are mentioned below.

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, $\Delta n$ denotes the optical anisotropy at 589 nm and 20° C., $\gamma_1$ denotes the rotational viscosity (mPa·s) at 20° C., $V_{10}$ denotes the voltage (V) for 10% transmission (viewing angle perpendicular to the plate surface), (threshold voltage), $\Delta \in$ denotes the dielectric anisotropy at 20° C. and 1 kHz ($\Delta \in = \in_\parallel - \in_\perp$, where $\in_\parallel$ denotes the dielectric constant parallel to the longitudinal axes of the molecules and $e_\perp$ denotes the dielectric constant perpendicular thereto), LTS denotes the low-temperature stability at −20° C. (in hours), HR denotes the voltage holding ratio (in %).

The electro-optical data are measured in a TN cell at the 1st minimum (i.e. at a d·$\Delta n$ value of 0.5 μm) at 20° C., unless expressly indicated otherwise.

The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

The HR value is measured as follows: The LC mixture is introduced into TN-VHR test cells (rubbed at 90°, alignment layer TN-polyimide, layer thickness d=6 μm). The HR value is determined after 5 min at 100° C. before and after UV exposure for 1 h (Atlas Suntest CPS+~750 W/m$^2$) at 1 V, 60 Hz, 64 μs pulse (measuring instrument: Autronic-Melchers VHRM-105).

In order to investigate the low-temperature stability, also referred to as "LTS", i.e. the stability of the LC mixture to individual components spontaneously crystallising out and/or the liquid-crystal mixture converting into a smectic/crystalline phase state at low temperatures, vials containing 1 g of LC mixture are placed in storage at −20° C., and it is regularly checked whether the mixtures have crystallised out or converted into a smectic phase state.

EXAMPLE 1

An LC mixture according to the invention comprising a compound of the formula I (PGQU-3-F) is formulated as follows:

| | | | |
|---|---|---|---|
| CC-3-V | 33.00% | Clearing point [° C.]: | 80.0 |
| PGQU-3-F | 14.00% | Δn [589 nm, 20° C.]: | 0.1295 |
| PGU-3-F | 7.00% | Δε [kHz, 20° C.]: | +16.8 |
| CCP-V-1 | 10.00% | $\gamma_1$ [mPa·s, 20° C.]: | 98 |
| CCP-3-1 | 1.50% | $V_{10}$ [V]: | 1.11 |
| CCQU-3-F | 4.00% | HR (initial): | 97.7% |
| PGUQU-3-F | 4.50% | HR (1 h UV): | 71.9% |
| PGUQU-4-F | 9.00% | | |
| PGUQU-5-F | 9.00% | | |
| DPGU-4-F | 8.00% | | |

EXAMPLE 2

An LC mixture according to the invention comprising a compound of the formula I (PGQU-3-F) is formulated as follows:

| | | | |
|---|---|---|---|
| CC-3-V | 28.00% | Clearing point [° C.]: | 79.0 |
| PGQU-3-F | 17.00% | Δn [589 nm, 20° C.]: | 0.1295 |
| PGU-3-F | 10.00% | Δε [kHz, 20° C.]: | +16.3 |
| CCP-V-1 | 9.00% | $\gamma_1$ [mPa·s, 20° C.]: | 104 |
| CCP-3-1 | 5.00% | $V_{10}$ [V]: | 1.10 |
| CCQU-3-F | 4.00% | LTS [h]: | 1000 |
| APUQU-3-F | 3.00% | HR (initial): | 98.0% |
| PGUQU-3-F | 4.00% | HR (1 h UV): | 72.6% |
| PGUQU-4-F | 8.00% | | |
| PGUQU-5-F | 8.00% | | |
| CCGU-3-F | 4.00% | | |

EXAMPLE 3

An LC mixture according to the invention comprising a compound of the formula I (PGQU-3-F) is formulated as follows:

| | | | |
|---|---|---|---|
| PGQU-3-F | 7.50% | Clearing point [° C.]: | 80.0 |
| CC-3-V | 50.50% | Δn [589 nm, 20° C.]: | 0.1284 |
| PGUQU-3-F | 6.00% | Δε [kHz, 20° C.]: | +6.5 |
| PGP-2-2V | 17.00% | $\gamma_1$ [mPa·s, 20° C.]: | 62 |
| PGP-2-5 | 5.00% | $V_{10}$ [V]: | |
| CPGU-3-OT | 7.00% | HR (initial): | 99.3% |
| APUQU-3-F | 7.00% | HR (1 h UV): | 92.9% |

The invention claimed is:

1. A liquid-crystalline medium, comprising one or more compounds of formula I and one or more compounds of formula XXVI,

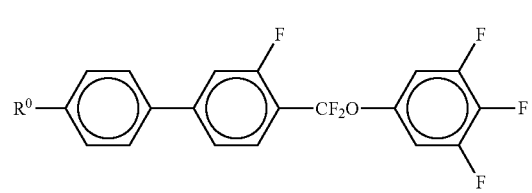

I

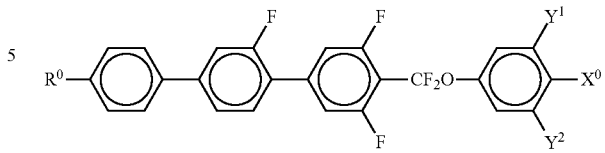

XXVI in which
R⁰ denotes an alkyl or alkoxy radical having 1 to 15 C atoms, in which one or more CH₂ groups are each optionally replaced, independently of one another, by —C≡C—, —CF₂O—, —CH=CH—,

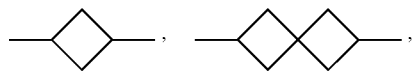

—O—, —CO—O— or —O—CO— in such a way that O atoms are not linked directly to one another, and in which one or more H atoms are optionally replaced by halogen atoms,
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, and
Y¹ and Y² each, independently of one another, denote H or F.

2. A liquid-crystalline medium according to claim 1, further comprising one or more compounds of formulae II and/or III,

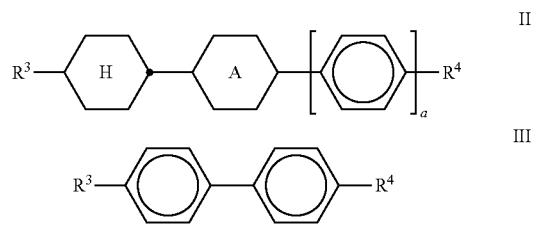

II

III in which
A denotes 1,4-phenylene or trans-1,4-cyclohexylene,
a denotes 0 or 1,
R³ denotes alkenyl having 2 to 9 C atoms, and
R⁴ denotes an alkyl or alkoxy radical having 1 to 15 C atoms, in which one or more CH₂ groups are each optionally replaced, independently of one another, by —C≡C—, —CF₂O—, —CH=CH—,

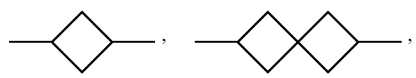

—O—, —CO—O— or —O—CO— in such a way that O atoms are not linked directly to one another, and in which one or more H atoms are optionally replaced by halogen atoms.

3. A liquid-crystalline medium according to claim 1, further comprising one or more of the following compounds

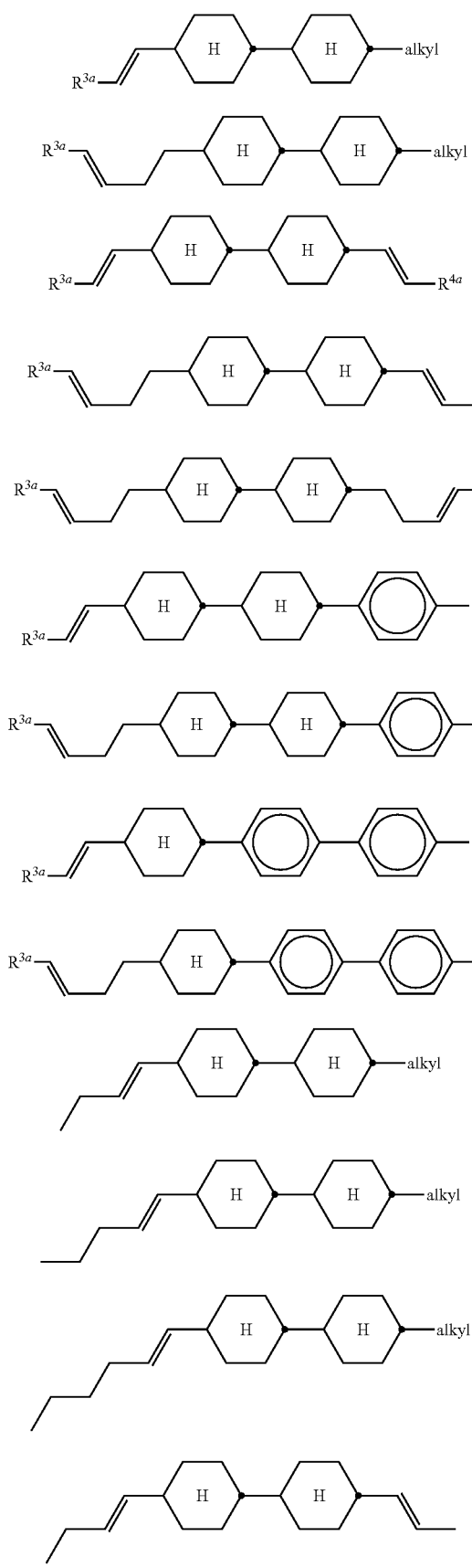
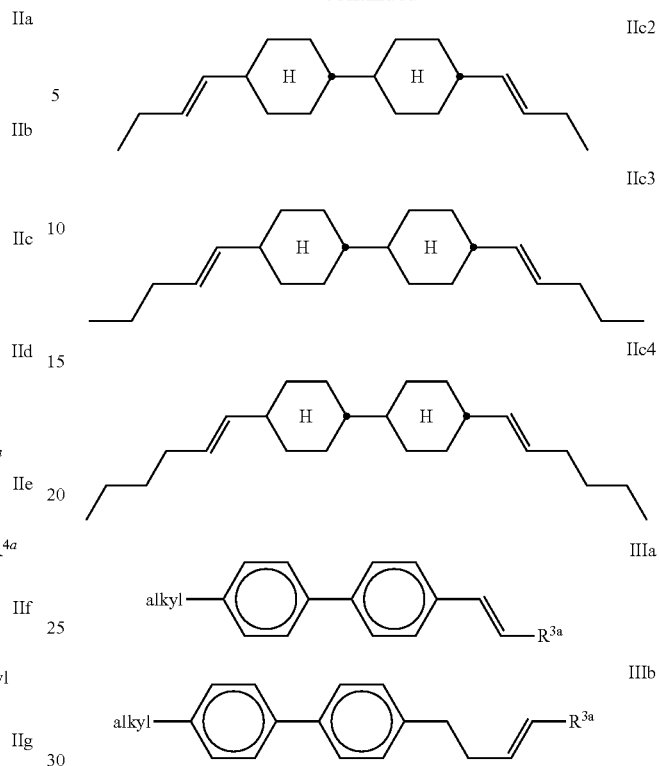
in which
R$^{3a}$ and R$^{4a}$ each, independently of one another, denote H, CH$_3$, C$_2$H$_5$ or C$_3$H$_7$, and
"alkyl" denotes a straight-chain alkyl group having 1 to 8 C atoms.
4. A liquid-crystalline medium according to claim 1, further comprising one or more compounds of formulae IV to VIII,
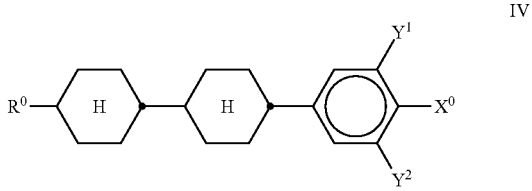
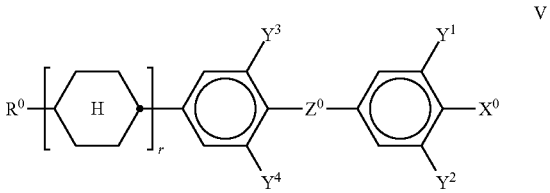
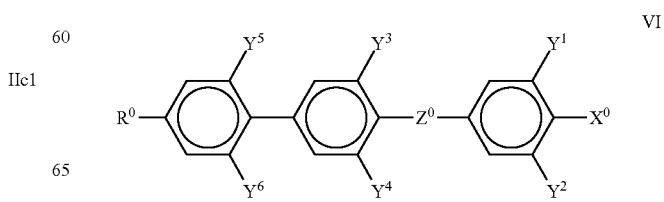

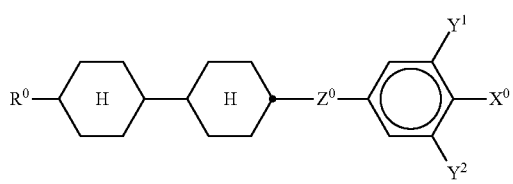  VII

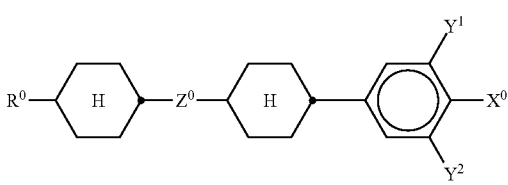  VIII in which

R⁰ denotes an alkyl or alkoxy radical having 1 to 15 C atoms, in which one or more $CH_2$ groups are each optionally replaced, independently of one another, by —C≡C—, —$CF_2$O—, —CH=CH—,

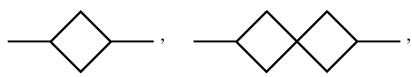

—O—, —CO—O— or —O—CO— in such a way that O atoms are not linked directly to one another, and in which one or more H atoms are optionally replaced by halogen atoms, and $Y^{1-6}$ each, independently of one another, denote H or F, $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2$O—, —O$CH_2$—, —COO—, —$CF_2$O— or —O$CF_2$—, and in formulae V and VI also a single bond, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, and r denotes 0 or 1.

5. A liquid-crystalline medium according to claim 1, further comprising one or more compounds of formulae VI-1a to VI-1d,

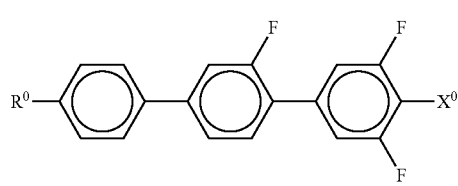  VI-1a

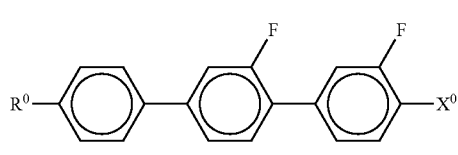  VI-1b

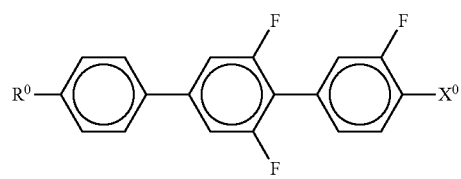  VI-1c

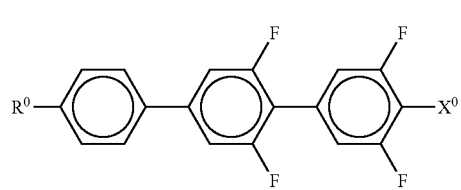  VI-1d in which

R⁰ denotes an alkyl or alkoxy radical having 1 to 15 C atoms, in which one or more $CH_2$ groups are each optionally replaced, independently of one another, by —C≡C—, —$CF_2$O—, —CH=CH—,

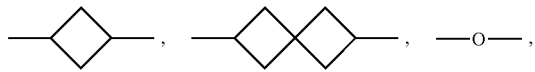

—CO—O— or —O—CO— in such a way that O atoms are not linked directly to one another, and in which one or more H atoms are optionally replaced by halogen atoms, and $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms.

6. A liquid-crystalline medium according to claim 1, further comprising one or more compounds of formulae VIII-1a and VII-1b,

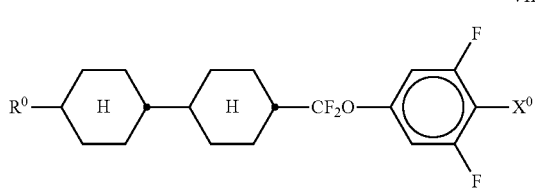  VII-1a

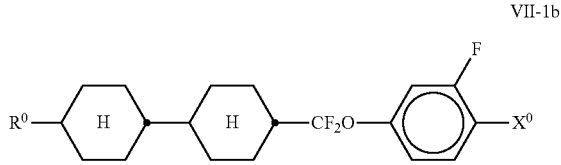  VII-1b in which

R⁰ denotes an alkyl or alkoxy radical having 1 to 15 C atoms, in which one or more $CH_2$ groups are each optionally replaced, independently of one another, by —C≡C—, —$CF_2$O—, —CH=CH—,

—CO—O— or —O—CO— in such a way that O atoms are not linked directly to one another, and in which one or more H atoms are optionally replaced by halogen atoms, and X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms.

7. A liquid-crystalline medium according to claim 1, further comprising one or more compounds of formula XIb

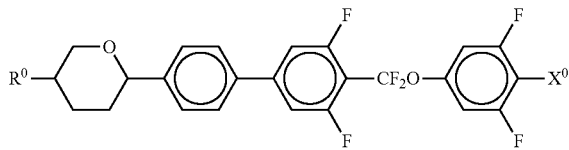

XIb in which

R⁰ denotes an alkyl or alkoxy radical having 1 to 15 C atoms, in which one or more CH₂ groups are each optionally replaced, independently of one another, by —C≡C—, —CF₂O—, —CH=CH—,

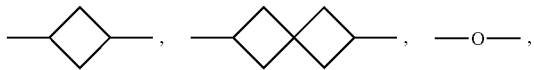

—CO—O— or —O—CO— in such a way that O atoms are not linked directly to one another, and in which one or more H atoms are optionally replaced by halogen atoms, and X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms.

8. A liquid-crystalline medium according to claim 1, further comprising one or more compounds of formula XIII

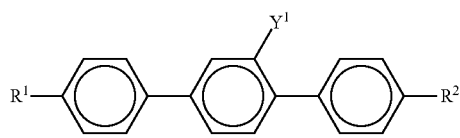

XIII in which

R¹ and R² each, independently of one another, denote n-alkyl, alkoxy, oxaalkyl, fluoroalkyl or alkenyl, each having up to 9 C atoms, and Y¹ denotes H or F.

9. A liquid-crystalline medium according to claim 1 which comprises 1-25% by weight of one or more compounds of formula I.

10. A method of generating an electro-optical effect comprising applying a voltage to a liquid-crystalline medium according to claim 1.

11. An alectro-optical liquid-crystal display containing a liquid-crystalline medium according to claim 1.

12. A process for preparing a liquid-crystalline medium according to claim 1, comprising mixing one or more compounds of formula I with one or more compounds of formula XXVI and optionally with one or more further liquid-crystalline compounds and optionally with one or more additives.

13. A liquid-crystalline medium according to claim 1, further comprising a compound of formula XXIIa

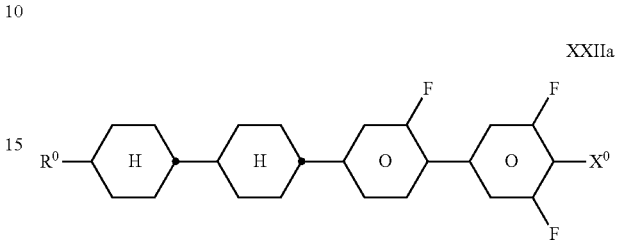

XXIIa in which

R⁰ denotes an alkyl or alkoxy radical having 1 to 15 C atoms, in which one or more CH₂ groups are each optionally replaced, independently of one another, by —C≡C—, —CF₂O—, —CH=CH—,

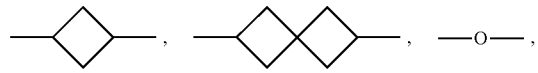

—CO—O— or —O—CO— in such a way that O atoms are not linked directly to one another, and in which one or more H atoms are optionally replaced by halogen atoms, and X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms.

14. A liquid-crystalline medium according to claim 1, further comprising a compound of formula XXVa

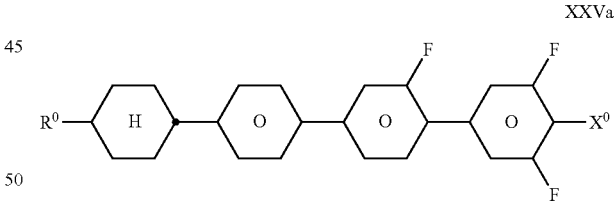

XXVa in which

R⁰ denotes an alkyl or alkoxy radical having 1 to 15 C atoms, in which one or more CH₂ groups are each optionally replaced, independently of one another, by —C≡C—, —CF₂O—, —CH=CH—,

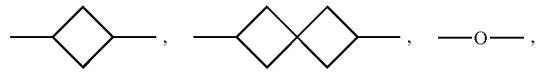

—CO—O— or —O—CO— in such a way that O atoms are not linked directly to one another, and in which one or more H atoms are optionally replaced by halogen atoms, and $X^1$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms.

15. A liquid-crystalline medium according to claim 1, further comprising a compound of formula XXVIIIb

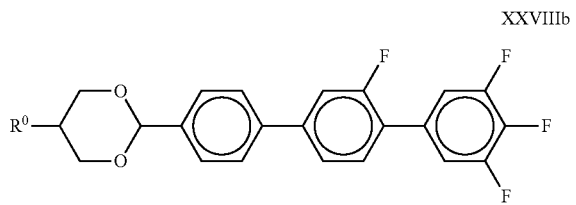

XXVIIIb in which $R^0$ denotes an alkyl or alkoxy radical having 1 to 15 C atoms, in which one or more $CH_2$ groups are each optionally replaced, independently of one another, by —C≡C—, —$CF_2$O—, —CH=CH—,

—CO—O— or —O—CO— in such a way that O atoms are not linked directly to one another, and in which one or more H atoms are optionally replaced by halogen atoms.

16. A liquid-crystalline medium according to claim 1, further comprising a compound of formula XIII-1

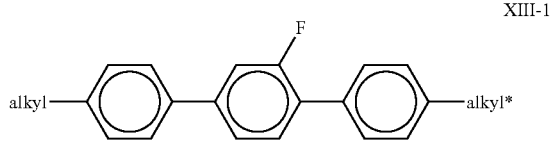

XIII-1 in which

"alkyl" and "alkyl*" each, independently of one another, denote a straight-chain alkyl radical having 1 to 6 C atoms.

17. A liquid-crystalline medium according to claim 1, further comprising a compound of formula XIII-3

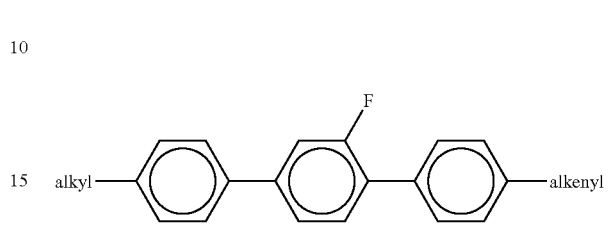

XIII-3 in which

"alkyl" denotes a straight-chain alkyl radical having 1 to 6 C atoms, and

"alkenyl" denotes a straight-chain alkenyl radical having 2 to 6 C atoms.

18. A liquid-crystalline medium according to claim 1, further comprising a compound of formula IIa

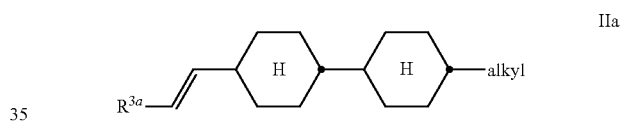

IIa in which $R^{3a}$ and $R^{4a}$ each, independently of one another, denote H, $CH_3$, $C_2H_5$ or $C_3H_7$, and "alkyl" denotes a straight-chain alkyl group having 1 to 8 C atoms.

\* \* \* \* \*

UNITED STATES PATENT AND TRADEMARK OFFICE
CERTIFICATE OF CORRECTION

PATENT NO. : 8,821,757 B2  
APPLICATION NO. : 13/578890  
DATED : September 2, 2014  
INVENTOR(S) : Michael Wittek et al.

Page 1 of 1

It is certified that error appears in the above-identified patent and that said Letters Patent is hereby corrected as shown below:

In the Claims:

Column 71, line 1 (Claim 14), reads as follows: -- $X^1$ denotes F, Cl, CN, $SF_5$, SCN, NCS, a halogenated alkyl -- Should read as: -- $X^0$ denotes F, Cl, CN, $SF_5$, SCN, NCS, a halogenated alkyl --

Signed and Sealed this  
Tenth Day of February, 2015

Michelle K. Lee  
*Deputy Director of the United States Patent and Trademark Office*